US009977793B2

(12) United States Patent
Ikeda

(10) Patent No.: US 9,977,793 B2
(45) Date of Patent: May 22, 2018

(54) INFORMATION PROCESSING SYSTEM, INFORMATION PROCESSING METHOD, AND INFORMATION PROCESSING APPARATUS

(71) Applicant: Tetsuya Ikeda, Tokyo (JP)

(72) Inventor: Tetsuya Ikeda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 351 days.

(21) Appl. No.: 14/810,629

(22) Filed: Jul. 28, 2015

(65) Prior Publication Data
US 2016/0034497 A1 Feb. 4, 2016

(30) Foreign Application Priority Data

Jul. 31, 2014 (JP) .................................. 2014-157154

(51) Int. Cl.
*G06F 17/30* (2006.01)
(52) U.S. Cl.
CPC .. *G06F 17/30256* (2013.01); *G06F 17/30277* (2013.01); *G06F 17/30312* (2013.01)
(58) Field of Classification Search
CPC ......... G06F 17/30312; G06F 17/30256; G06F 17/30277
USPC .......................................................... 707/741
See application file for complete search history.

(56) References Cited

U.S. PATENT DOCUMENTS

| 8,514,458 B2* | 8/2013 | Baba ................. H04N 1/32358 358/1.1 |
| 8,744,241 B2* | 6/2014 | Ishii ..................... G11B 27/034 386/239 |
| 9,608,995 B2 | 3/2017 | Kishi et al. |
| 9,753,987 B1* | 9/2017 | Dolan ................. G06F 17/3053 |
| 2009/0248903 A1* | 10/2009 | Nishita ................... G06F 13/28 710/5 |
| 2010/0166392 A1* | 7/2010 | Ishii ..................... G11B 27/034 386/201 |

(Continued)

FOREIGN PATENT DOCUMENTS

| JP | 2003-345959 | 12/2003 |
| JP | 2007-133627 | 5/2007 |

(Continued)

*Primary Examiner* — Phong H Nguyen
(74) *Attorney, Agent, or Firm* — Harness, Dickey & Pierce, P.L.C.

(57) ABSTRACT

An information processing system includes an information processing apparatus and one or more terminal devices. The information processing system includes: an image transmitting unit configured to transmit an image; an image acquiring unit configured to acquire the image transmitted by the image transmitting unit, and assign unique identification information to the acquired image; a feature information extracting unit configured to extract feature information from the image acquired by the image acquiring unit; a first image storage unit configured to store therein the feature information and the identification information in an associated manner; and a managing unit configured to, when an amount of the feature information stored in the first image storage unit exceeds a threshold, change the first image storage unit into a second image storage unit, generate a new first image storage unit, and prohibit the second image storage unit from storing therein new feature information.

13 Claims, 21 Drawing Sheets

(56) References Cited

U.S. PATENT DOCUMENTS

| | | | |
|---|---|---|---|
| 2010/0306238 A1* | 12/2010 | Balakrishnan | G06F 17/30631 707/769 |
| 2014/0006387 A1 | 1/2014 | Kishi et al. | |
| 2014/0006435 A1 | 1/2014 | Kishi et al. | |
| 2016/0034497 A1* | 2/2016 | Ikeda | G06F 17/30256 707/741 |
| 2017/0155656 A1 | 6/2017 | Kishi et al. | |

FOREIGN PATENT DOCUMENTS

| | | |
|---|---|---|
| JP | 2011-090348 | 5/2011 |
| JP | 2014-010722 | 1/2014 |
| JP | 2014-010723 | 1/2014 |
| JP | 2016-12207 A | 1/2016 |

\* cited by examiner

FIG.3

| IMAGE ID | THUMBNAIL | TITLE | BODY TEXT | IMAGE CAPTURING LOCATION | OPTION |
|---|---|---|---|---|---|
| 5p73vuvg17 | ffd8ffe000104a46··· | GOOD UNKNOWN SPOT FOR CHERRY BLOSSOM | COMMENTS OF WHO REACHED THIS LOCATION ARE SOUGHT | 35.685, 139.753 | LOCATION-LIMITED, ADDITIONALLY WRITABLE |
| f49d4fd389 | fdb004300020202··· | My SNS | http://xxx.com/yyy | | ADDITIONALLY UNWRITABLE |
| bd428ac881 | 946000101000000··· | TREASURE HUNTING 1 | HINT FOR NEXT LOCATION: ○○ | 35.650, 139.812 | LOCATION-LIMITED, ADDITIONALLY UNWRITABLE |
| wr733nbyw6 | f8461b1d0f4d875··· | TREASURE HUNTING 2 | GO TO ○○ OF ×× | 35.630, 139.888 | LOCATION-LIMITED, ADDITIONALLY UNWRITABLE |

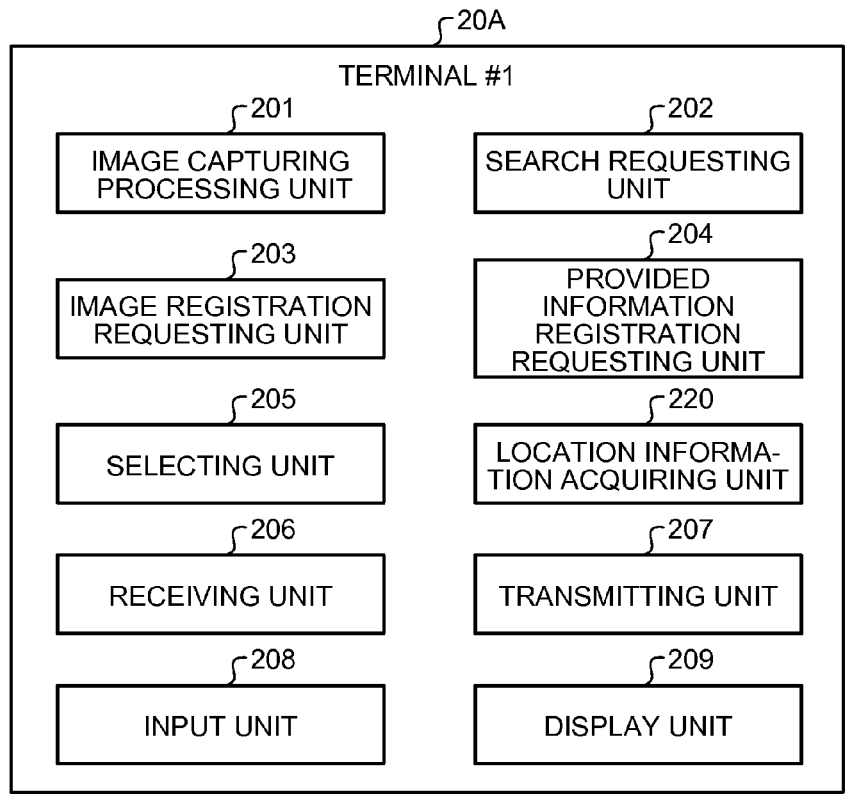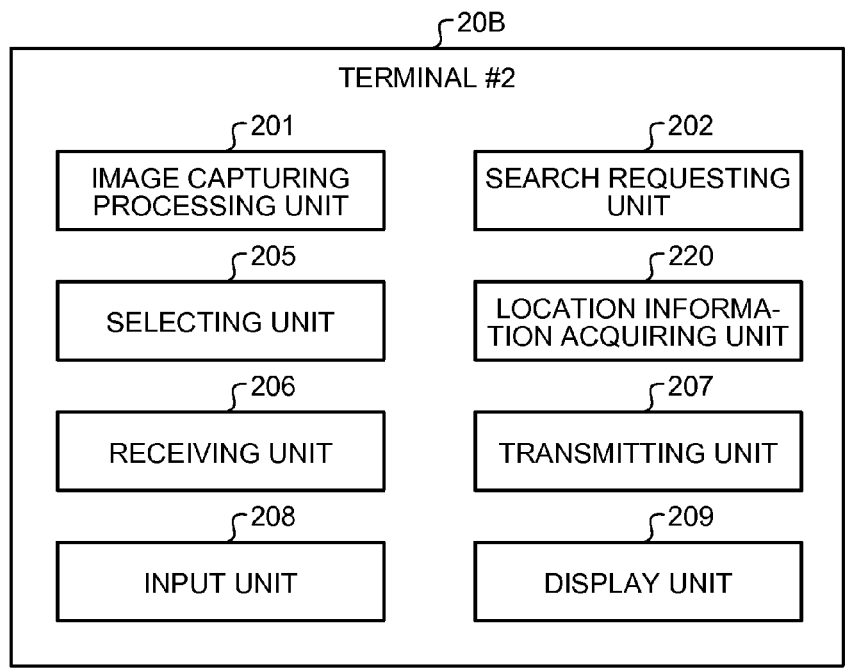

INFORMATION PROCESSING SYSTEM, INFORMATION PROCESSING METHOD, AND INFORMATION PROCESSING APPARATUS

CROSS-REFERENCE TO RELATED APPLICATIONS

The present application claims priority to and incorporates by reference the entire contents of Japanese Patent Application No. 2014-157154 filed in Japan on Jul. 31, 2014.

BACKGROUND OF THE INVENTION

1. Field of the Invention

The present invention relates to an information processing system, an information processing method, and an information processing apparatus.

2. Description of the Related Art

There is a known image search technology to extract feature points from a captured image obtained by capturing an image by a camera for example, and search for an image with a number of similar feature points from an image group registered in advance. There is a known technology using the image search technology to register an image of a specific photograph or a printed material in a database in association with various kinds of electronic data, retrieve a similar image from the database by using a captured image obtained by capturing the image of the photograph or the printed material, and present electronic data associated with the similar image (for example, Japanese Laid-open Patent Publication No. 2014-010723).

A case will be considered in which, in an image search service using the image search technology as described above, a user using the service is allowed to register an image and electronic data associated with the image in a database. According to the technique described in Japanese Laid-open Patent Publication No. 2014-010723, registration of an image and electronic data associated with the image in a database is performed by a provider of the image search service. Therefore, in this case, there is a need to wait for a process of the image search service to complete before the user registers the image and the electronic data in the database, so that it takes a long time before a search is enabled after the registration of the image.

In view of the above circumstances, there is a need to improve the convenience of information transmission and reception using an image search.

SUMMARY OF THE INVENTION

It is an object of the present invention to at least partially solve the problems in the conventional technology.

An information processing system includes an information processing apparatus and one or more terminal devices. The information processing system includes: an image transmitting unit configured to transmit an image; an image acquiring unit configured to acquire the image transmitted by the image transmitting unit, and assign unique identification information to the acquired image; a feature information extracting unit configured to extract feature information from the image acquired by the image acquiring unit; a first image storage unit configured to store therein the feature information and the identification information in an associated manner; and a managing unit configured to, when an amount of the feature information stored in the first image storage unit exceeds a threshold, change the first image storage unit into a second image storage unit, generate a new first image storage unit, and prohibit the second image storage unit from storing therein new feature information.

An information processing method includes: acquiring an image; assigning unique identification information to the acquired image; extracting feature information from the acquired image; storing the feature information and the identification information in a first image storage unit in an associated manner; and, when an amount of feature information stored in the first image storage unit exceeds a threshold, changing the first image storage unit into a second image storage unit, generating a new first image storage unit, and prohibiting the second image storage unit from storing therein new feature information.

An information processing apparatus includes: an image acquiring unit configured to acquire an image and assign unique identification information to the acquired image; a feature information extracting unit configured to extract feature information from the image acquired by the image acquiring unit; a first image storage unit configured to store therein the feature information and the identification information in an associated manner; and a managing unit configured to, when an amount of feature information stored in the first image storage unit exceeds a threshold, change the first image storage unit into a second image storage unit, generate a new first image storage unit, and prohibit the second image storage unit from storing therein new feature information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating a configuration example of a table for storing provided information in a provided information DB according to the first embodiment;

FIG. 5 is a functional block diagram for explaining functions of a terminal device according to the first embodiment;

FIG. 6 is a functional block diagram for explaining functions of a terminal device according to the first embodiment;

DETAILED DESCRIPTION OF THE PREFERRED EMBODIMENTS

Exemplary embodiments of an information processing system, an information processing method, and an information processing apparatus according to the present invention will be described in detail below with reference to the accompanying drawings.

First Embodiment

Figure 1:
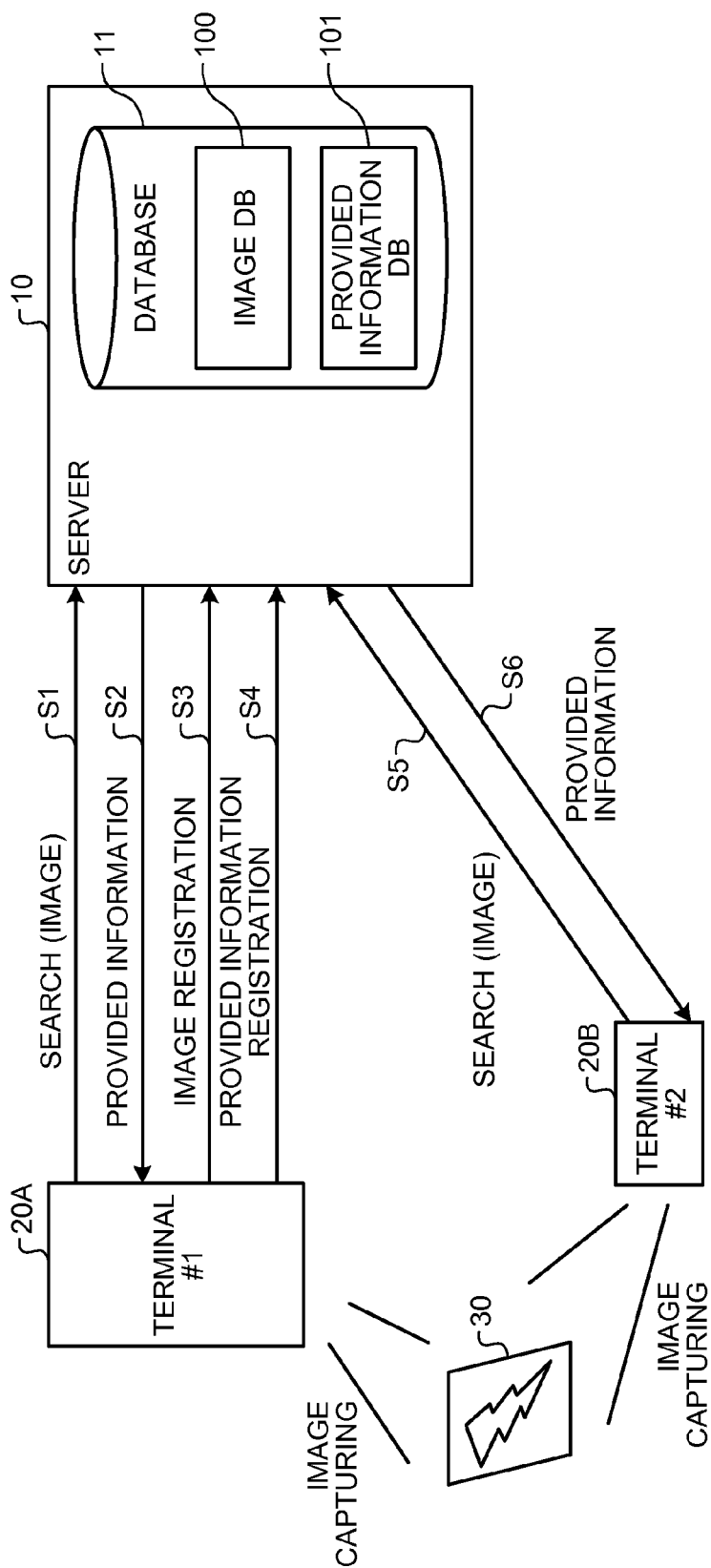
FIG. 1 is a block diagram schematically illustrating a configuration example of an information processing system according to a first embodiment.

FIG. 1 schematically illustrates a configuration example of an information processing system according to a first embodiment. In FIG. 1, the information processing system includes a server 10 and one or more terminal devices 20A and 20B. As the terminal devices 20A and 20B, multi-function mobile terminals or tablet computers with image capturing functions may be employed, for example. In FIG. 1, the terminal devices 20A and 20B are represented as terminals #1 and #2, respectively. Each of the terminal devices 20A and 20B can communicate with the server 10 via a network. The server 10 may consist of a single information processing apparatus or by a plurality of information processing apparatuses connected to one another by distributing functions.

The server 10 includes a database 11. The database 11 includes an image database (DB) 100 and a provided information database (DB) 101. In the image DB 100, an image is registered in a searchable manner. In reality, the server 10 has a function to extract feature information representing a feature of an image from the image, and registration of the image in the image DB 100 is performed by storing the feature information representing the feature of the image and storing image identification information for identifying the image in an associated manner. The provided information DB 101 stores therein provided information to be provided to a user and the image identification information in an associated manner.

Each of the terminal devices 20A and 20B has an image capturing function, and transmits an image obtained by capturing the image to the server 10 via the network.

In the configuration as described above, for example, the terminal device 20A activates the image capturing function to capture an image of an object 30 in response to a user operation, and transmits, to the server 10, the captured image and a search request to request a search for an image similar to the captured image (Step S1). The server 10 searches for an image similar to the captured image from the image DB 100 in accordance with the captured image and the search request transmitted from the terminal device 20A, and outputs identification information on a retrieved image as a search result.

For example, the server 10 extracts feature information from the image transmitted from the terminal device 20A, and calculates a similarity between the extracted feature information and feature information stored in the image DB 100. The server 10 extracts feature information with a high similarity from the feature information stored in the image DB 100, and outputs identification information corresponding to the extracted feature information.

Subsequently, the server 10 acquires, from the provided information DB 101, provided information associated with the identification information output as the search result. The server 10 transmits the acquired provided information to the terminal device 20A (Step S2). The terminal device 20A displays the provided information transmitted from the server 10 on a display, for example. Therefore, a user of the terminal device 20A can acquire the provided information from the captured image of the object 30.

In the first embodiment, the server 10 is able to newly register, in the image DB 100, an image of the object 30 captured by the terminal device 20A. For example, if the image DB 100 does not contain feature information corresponding to the image that is transmitted from the terminal device 20A with respect to the search request transmitted together with the image at Step S1 as described above, the server 10 stores the feature information on the image in the image DB 100.

For example, if the server 10 transmits notice that the feature information on the image corresponding to the search request is not stored, the terminal device 20A transmits, to the server 10, a registration request to request registration of the image in response to the notice (Step S3).

In response to the image registration request transmitted from the terminal device 20A, the server 10 generates unique identification information to the feature information on the image that is transmitted from the terminal device 20A at Step S1, and stores the generated identification information in the image DB 100 in association with the image.

Further, the terminal device 20A transmits, to the server 10, provided information corresponding to the image and a provided information registration request to request registration of the provided information (Step S4). Meanwhile, the terminal device 20A is able to acquire the provided information in response to a user operation on the terminal device 20A, for example. In response to the provided information registration request transmitted from the terminal device 20A, the server 10 stores the provided information transmitted together with the request, in the provided information DB 101 in association with the identification information that is generated in response to the registration request transmitted at Step S3.

Meanwhile, the terminal device 20B obtains an image by capturing the same object 30 as captured by the terminal device 20A or an object similar to the object 30 in response to a user operation, for example. The terminal device 20B transmits, to the server 10, the captured image and a search request to request a search for an image similar to the captured image (Step S5). The server 10 searches for an image similar to the captured image from the image DB 100 in accordance with the captured image and the search request transmitted from the terminal device 20B, and outputs identification information on a retrieved image as a search result, in the same manner as described above.

Subsequently, the server 10 acquires, from the provided information DB 101, provided information associated with the identification information output as the search result. The server 10 transmits the acquired provided information to the terminal device 20B (Step S6). The terminal device 20A displays the provided information transmitted from the server 10 on a display, for example.

In this way, according to the first embodiment, the terminal devices 20A and 20B can share the provided information via the image obtained by capturing the image of the object 30. Further, according to the first embodiment, by capturing an image of the object 30 through an operation on the terminal device 20A, by registering the captured image in the server 10, and by registering the provided information in the server 10 in association with the image, a user can send information to the terminal device 20B via the image. Furthermore, according to the first embodiment, information sharing and information sending as described above can be realized without exchanging personal information, such as an e-mail address.

Figure 2:
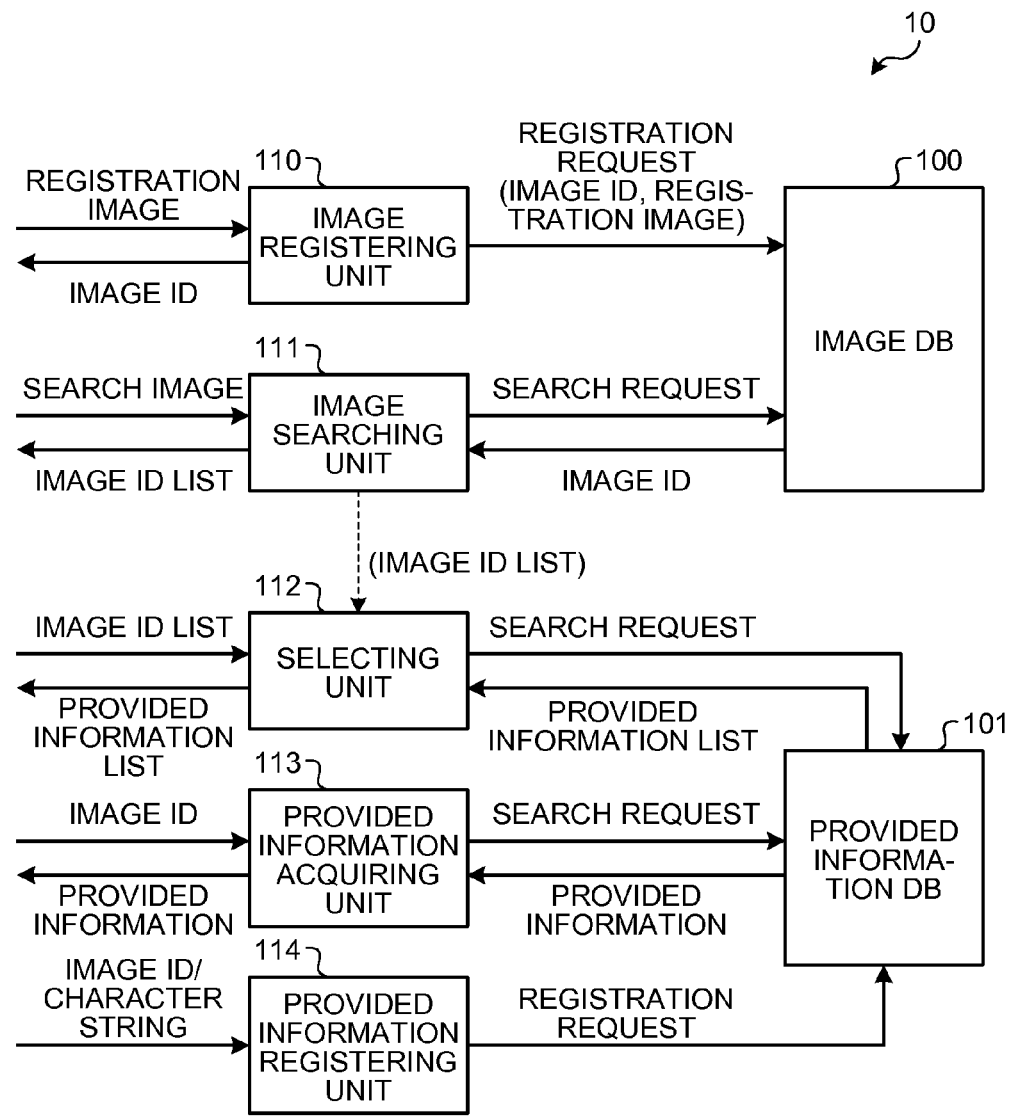
FIG. 2 is a block diagram illustrating a configuration example of a server according to the first embodiment.

Configurations of units of the first embodiment will be described in detail below. FIG. 2 illustrates a configuration example of the server 10 according to the first embodiment. In FIG. 2, the server 10 includes the image DB 100, the provided information DB 101, an image registering unit 110, an image searching unit 111, a selecting unit 112, a provided information acquiring unit 113, and a provided information registering unit 114.

Incidentally, in the configuration of the server 10, the image registering unit 110, the image searching unit 111, the selecting unit 112, the provided information acquiring unit 113, and the provided information registering unit 114 are realized by a program that runs on a central processing unit (CPU); however, it is not limited thereto. The image registering unit 110, the image searching unit 111, the selecting unit 112, the provided information acquiring unit 113, and the provided information registering unit 114 may consist of respective pieces of hardware that operate in cooperation with one another.

The image registering unit 110 performs a process of registering an image in the image DB 100. The image registering unit 110 receives a registration image, which is transmitted via the network and to be registered in the image DB 100, and a registration request to request registration of the registration image in the image DB 100. The image registering unit 110 generates an image ID, which is identification information for uniquely identifying the received image, assigns the image ID to the image, and sends the image ID, the registration image, and the registration request to the image DB 100, and performs a process of registering the image in the image DB 100. Further, the image registering unit 110 transmits the image ID to a transmission source of the registration image.

A generation method and a format of the image ID are not specifically limited as long as the image ID is unique to an image registered in the image DB 100. For example, the image registering unit 110 may generate a character string by generating a predetermined number (for example, about 10) of alphanumeric characters at random, check whether the character string is a duplicate of an already-generated image ID, and use, as the image ID, the character string determined as not being the duplicate.

The image searching unit 111 performs a process of searching the image DB 100 on the basis of an image. The image searching unit 111 receives a search image as a search target and a search request to request a search through the image DB 100 based on the search image, where the search image and the search request are transmitted via the network. The image searching unit 111 sends the search image and the search request to the image DB 100, receives an image ID from the image DB 100 as a search result, and transmits the received image ID to a transmission source of the search image. In this case, if a plurality of image IDs are obtained as search results in response to a single search image and a single search request, the image searching unit 111 transmits an image ID list including the image IDs to the transmission source of the search image.

The provided information registering unit 114 performs a process of registering provided information in the provided information DB 101. The provided information registering unit 114 receives a character string to be a basis of the provided information to be registered in the provided information DB 101, a registration request to request registration of the provided information in the provided information DB 101, and an image ID of an image to be associated with the provided information, where the character string, the registration request, and the image ID are transmitted via the network. The provided information registering unit 114 sends, to the provided information DB 101, the received provided information, the received image ID, and a registration request to request registration of the provided information and the image ID in an associated manner.

The selecting unit 112 receives the image ID list transmitted via the network for example, and sends, to the provided information DB 101, the image ID list and a search request to search for provided information associated with the image IDs included in the list. At this time, the selecting unit 112 generates the search request so as to acquire information needed for a user to visually select an object for which provided information is to be acquired. The selecting unit 112 transmits, to a transmission source of the image ID, a list of provided information retrieved from the provided information DB 101 in response to the search request.

Incidentally, the selecting unit 112 does not necessarily have to receive the image ID list via the network, and may directly acquire the image ID list as a search result from the image searching unit 111, for example.

The provided information acquiring unit 113 searches the provided information DB 101 for provided information associated with the image ID transmitted via the network, and transmits retrieved provided information to the transmission source of the image ID. The provided information acquiring unit 113, upon receiving the image ID transmitted via the network, sends a search request to search for provided information associated with the received image ID to the provided information DB 101. The provided information DB 101 searches for provided information associated with the image ID in response to the search request, and sends the provided information to the provided information acquiring unit 113.

In the first embodiment, as described above with reference to FIG. 1, the terminal device 20A can perform the above described transmission, that is, transmission of the registration image and the registration request to the image registering unit 110, transmission of the captured image (search image) and the search request to the image searching unit 111, transmission of the image ID list to the selecting unit 112, transmission of the image ID to the provided information acquiring unit 113, and transmission of the image ID, the provided information, and the registration request to the provided information registering unit 114. Therefore, the image searching unit 111, the selecting unit 112, and the provided information acquiring unit 113 transmit the image ID list, the provided information list, and the provided information to the terminal device 20A.

Further, in the example in FIG. 1, the terminal device 20B does not perform registration of the image and the provided information, and therefore, does not perform transmission of the registration image and the registration request to the image registering unit 110 and transmission of the image ID, the provided information, and the registration request to the provided information registering unit 114. The terminal device 20B performs transmission of the captured image (search image) and the search request to the image searching unit 111, transmission of the image ID list to the selecting unit 112, and transmission of the image ID to the provided information acquiring unit 113.

FIG. 3 illustrates a configuration example of a table for storing the provided information in the provided information DB 101. In general, the provided information DB 101 is constructed by using a relational database. In the example in FIG. 3, the table stores therein, in each record, a body of provided information and attribute information on the provided information in an associated manner, where the image ID is used as a key.

In the table illustrated in FIG. 3, in an item of "image ID", the image ID as a key for each record is stored. Other items of "thumbnail", "title", "body text", "image capturing location", and "option" are examples, and the table may be constructed by using different rows.

In the item of "thumbnail", a character string, which is converted from data representing a reduced image of a registration image, is stored. Image data of the thumbnail is converted to a character string by known Base64 encoding for example, and stored in the item of "thumbnail". In this case, it is possible to directly obtain the thumbnail image by decoding the character string stored in the item of "thumbnail" by Base64 decoding; however, it is not limited thereto. It may be possible to store, in the item of "thumbnail", information indicating a location in which the thumbnail image is stored. For example, the image registering unit 110 generates a thumbnail image and registers the thumbnail image in association with the image ID when the image registering unit 110 registers the registration image transmitted via the network in the image DB 100.

The item of "title" and the item of "body text" are character strings that are displayed by a display on the terminal device 20A or the terminal device 20B and presented to a user when being acquired as search results. If the character string stored in the item of "title" or the item of "body text" is in the uniform resource locator (URL) format, it is possible to present, on the terminal device 20A or the terminal device 20B, a Web page indicated by the URL on the network.

In the item of "image capturing location", information indicating a location where the image indicated by the image ID is captured. As the information indicating a location, a set of values of the latitude and the longitude may be used, for example. In the item of "option", information for setting a method of using the provided information associated with the image ID is stored, for example. For example, the item of "option" may indicate, by a character string of "location-limited", a setting such that presentation is not done unless a search is performed near a location indicated by the item of "image capturing location". For another example, the item of "option" may indicate, by a character string of "additionally writable" or "additionally unwritable", whether to allow a user who has searched for a corresponding record to perform additional writing to the item of "body text".

In the example in FIG. 3, the provided information DB 101 stores pieces of information included in the provided information to be distributed into respective relational rows; however, it is not limited thereto. In the provided information DB 101, all pieces of the information included in the provided information may be stored to be integrated into a single piece of information as in the Extensible Markup Language (XML) format, for example. In this case, it is possible to store different types of information for each record in the provided information DB 101.

Figure 4:
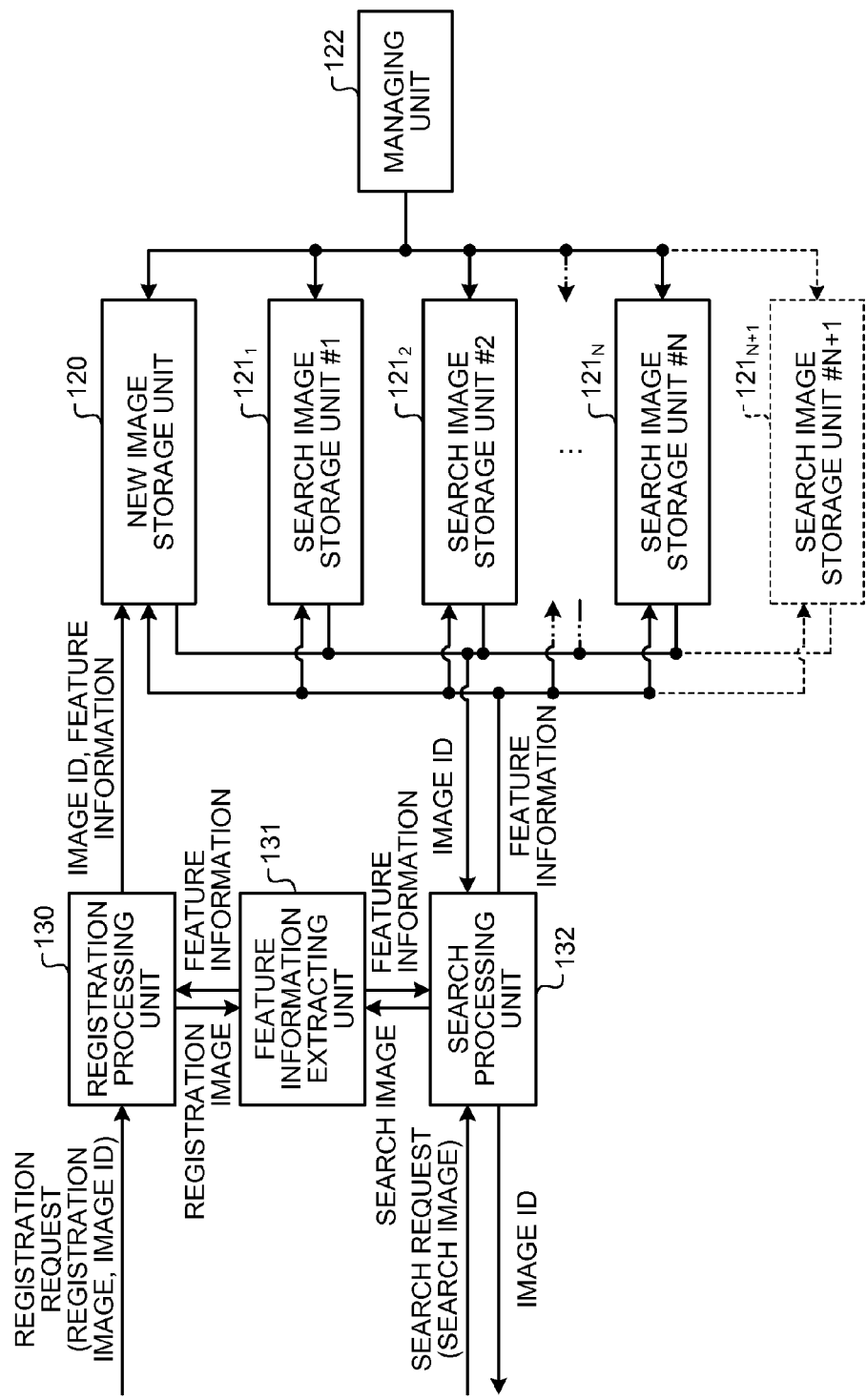
FIG. 4 is a block diagram illustrating a configuration example of an image DB according to the first embodiment.

FIG. 4 illustrates a configuration example of the image DB 100 according to the first embodiment. In FIG. 4 the image DB 100 includes a single new image storage unit 120, one or more search image storage units $121_1$, $121_2$, ..., $121_N$, a managing unit 122, a registration processing unit 130, a feature information extracting unit 131, and a search processing unit 132.

In the configuration of the image DB 100, the managing unit 122, the registration processing unit 130, the feature information extracting unit 131, and the search processing unit 132 are realized by a program that runs on a CPU; however, it is not limited thereto. The managing unit 122, the registration processing unit 130, the feature information extracting unit 131, and the search processing unit 132 may consist of respective pieces of hardware that operate in cooperation with one another. Further, the single new image storage unit 120 and the search image storage units $121_1$, $121_2$, ..., $121_N$ are storage areas reserved on a hard disk drive or a nonvolatile semiconductor memory (flash memory). In FIG. 4, the search image storage units $121_1$, $121_2$, ..., $121_N$ are represented as search image storage units #1, #2, ..., #N, respectively.

The registration processing unit 130 performs a process of storing a registration image in the new image storage unit 120 on the basis of the image ID, the registration image, and the registration request sent from the image registering unit 110, and registers the registration image in the image DB 100. The feature information extracting unit 131 analyzes the input image and extracts feature information. The extracted feature information is returned to the registration processing unit 130. Details of a process of extracting feature information by the feature information extracting unit 131 will be described later. The registration processing unit 130 sends the feature information and the image ID to the new image storage unit 120 and stores the image ID and the feature information in the new image storage unit 120 in an associated manner.

The managing unit 122 manages the new image storage unit 120 and the search image storage units $121_1$, $121_2$, ..., $121_N$. More specifically, when the amount of feature information stored in the new image storage unit 120 becomes equal to or greater than a predetermined amount, the managing unit 122 changes the new image storage unit 120 into a search image storage unit $121_{N+1}$ (indicated by a dotted line in FIG. 4), prohibits new feature information from being stored, and newly generates the new image storage unit 120. For example, the managing unit 122 newly generates the new image storage unit 120 by newly setting a storage area as the new image storage unit 120 on a storage in which the new image storage unit 120 and the search image storage units $121_1$, $121_2$, ... $121_N$ are stored. Then, the managing unit 122 sets the newly-generated new image storage unit 120 as a destination to which the registration processing unit 130 sends a registration image.

Specifically, through the management by the managing unit 122, when the amount of feature information stored in the new image storage unit 120 becomes equal to or greater than the predetermined amount, the new image storage unit 120 is changed into the search image storage unit $121_{N+1}$ while the feature information stored in the new image storage unit 120 are maintained. At this time, the contents stored in the existing search image storage units $121_1$, $121_2$, ..., $121_N$ are not changed.

Further, the search image storage unit $121_{N+1}$ changed from the new image storage unit 120 is prohibited from storing new feature information. Incidentally, in the initial state of the image DB 100, only the new image storage unit 120 among the new image storage unit 120 and the search image storage units $121_1$, $121_2$, ..., $121_N$ is present. In this state, if the amount of feature information stored in the new image storage unit 120 becomes equal to or greater than the predetermined amount, the new image storage unit 120 is changed into the search image storage unit $121_1$, and is prohibited from storing new feature information. Subsequently, the new image storage unit 120 is newly generated. Thereafter, every time the feature information stored in the new image storage unit 120 becomes equal to or greater than the predetermined amount, the search image storage unit $121_2$ ... is added in a similar manner. Therefore, all of the search image storage units $121_1$, $121_2$, ..., $121_N$ are prohibited from storing new feature information.

The search processing unit 132 searches for an image similar to the search image from the new image storage unit 120 and the one or more search image storage units $121_1$, $121_2$, ..., $121_N$ in accordance with the search image and the search request sent from the image searching unit 111. For example, the search processing unit 132 sends the search image to the feature information extracting unit 131 in response to the search request. The feature information extracting unit 131 analyzes the sent search image, extracts feature information, and returns the extracted feature information to the search processing unit 132.

The search processing unit 132 searches for feature information similar to the feature information returned from the feature information extracting unit 131, from the new image storage unit 120 and the search image storage units $121_1$, $121_2$, ..., $121_N$ on the basis of the returned featured information, and acquires, as a search result, an image ID associated with retrieved feature information. At this time, the search processing unit 132 may acquire a plurality of image IDs as a search result. The search processing unit 132 returns the image ID or an image ID list acquired as the search result to the image searching unit 111.

In this way, the search processing unit 132 performs a search process on all of the new image storage unit 120 and the search image storage units $121_1$, $121_2$, ..., $121_N$ as search targets.

An overview of the process of extracting feature information from an image by the feature information extracting unit 131 will be described below. The feature information extracting unit 131 is able to extract a feature point as feature information on an image, from the image by using a known image analysis technique. For example, the feature information extracting unit 131 is able to extract a feature point from an image by using a Scale-Invariant Feature Transform (SIFT) algorithm; however, it is not limited thereto. The feature information extracting unit 131 may extract a feature point by using other feature point extraction algorithms. A set of values called feature quantity is obtained for one feature point, which is extracted by the feature information extracting unit 131 by analyzing an image by using a feature point extraction algorithm. The feature quantity is a set of about 100 to 1000 values for each feature point, for example.

Next, a method of storing feature information in the new image storage unit 120 and the search image storage units $121_1$, $121_2$, ..., $121_N$ will be described. In the following, the new image storage unit 120 is described as an example from among the new image storage unit 120 and the search image storage units $121_1$, $121_2$, ..., $121_N$.

The new image storage unit 120 regards a set of values of the feature quantity as a multidimensional vector, and stores the feature quantity at each feature point in a multidimensional spatial index. As a means for implementing the multidimensional spatial index, for example, a means for using a K-d tree (K-dimensional tree) is known. The means for implementing the multidimensional spatial index applicable to the first embodiment is not limited to the K-d tree, and other means for implementing the multidimensional spatial index may be used.

Incidentally, in the case of a tree structure, such as a K-d tree, as a data structure, it is necessary to scan the entire tree from the root of the tree when an element is added or updated. Therefore, if the number of elements on the tree increases, it takes a long time to add or update an element. For example, if the K-d tree structure is applied to the new image storage unit 120 for storing the above described feature quantity, it takes several tens of minutes from a start of new addition of feature quantity to the end of the adding process. In this case, for example, even if the terminal device 20A transmits a registration image and a registration request to the server 10, it is necessary to wait for a long time until a search process on the registered image is enabled after the transmission; therefore, the convenience is reduced.

Therefore, in the first embodiment, as described above, if the amount of feature information stored in the new image storage unit 120 becomes equal to or greater than a predetermined amount, the new image storage unit 120 is changed into the search image storage unit $121_{N+1}$ that is prohibited from storing new feature information, and the new image storage unit 120 is newly generated. Therefore, even when the amount of images, that is, the amount of feature information, registered in the image DB 100 increases, the amount of feature information stored in each of the new image storage unit 120 and the search image storage units 121$_1$, 121$_2$, . . . , 121$_N$ is approximately constant. Consequently, it becomes possible to reduce a time to enable a search for an image after the registration of the image is requested.

With reference to FIG. 5 and FIG. 6, functions of the terminal devices 20A and 20B according to the first embodiment will be described. FIG. 5 is a functional block diagram for explaining the functions of the terminal device 20A according to the first embodiment. In FIG. 5, the terminal device 20A includes an image capturing processing unit 201, a search requesting unit 202, an image registration requesting unit 203, a provided information registration requesting unit 204, a selecting unit 205, a receiving unit 206, a transmitting unit 207, an input unit 208, a display unit 209, and a location information acquiring unit 220.

The image capturing processing unit 201, the search requesting unit 202, the image registration requesting unit 203, the provided information registration requesting unit 204, the selecting unit 205, the receiving unit 206, the transmitting unit 207, the input unit 208, the display unit 209, and the location information acquiring unit 220 are realized by a program that runs on a CPU; however, it is not limited thereto. Some or all of the image capturing processing unit 201, the search requesting unit 202, the image registration requesting unit 203, the provided information registration requesting unit 204, the selecting unit 205, the receiving unit 206, the transmitting unit 207, the input unit 208, the display unit 209, and the location information acquiring unit 220 may consist of respective pieces of hardware that operate in cooperation with one another.

The image capturing processing unit 201 activates a camera function of the terminal device 20A, controls an image capturing unit, and outputs a captured image. The receiving unit 206 performs a process of receiving data transmitted via a network. The transmitting unit 207 performs a process of transmitting data via a network. The input unit 208 receives an input operation on an input device of the terminal device 20A, and acquires data corresponding to the operation. The display unit 209 controls display of information on a display device of the terminal device 20A. The input unit 208 and the display unit 209 form a user interface (UI) of the terminal device 20A.

The search requesting unit 202 generates a search request to request a search based on the captured image acquired by the image capturing processing unit 201. The search requesting unit 202 transmits the captured image and the generated search request from the transmitting unit 207 to the server 10. The image registration requesting unit 203 generates a registration request to request registration of the captured image acquired by the image capturing processing unit 201 in the image DB 100. The image registration requesting unit 203 transmits the captured image and the generated registration request from the transmitting unit 207 to the server 10. The provided information registration requesting unit 204 generates a provided information registration request to request registration of provided information to be associated with the image registered in the image DB 100. The provided information registration requesting unit 204 transmits an image ID, which is acquired according to the search request or the image registration request, and the provided information registration request from the transmitting unit 207 to the server 10.

The receiving unit 206 receives the image ID (image ID list), the provided information, and the like that are transmitted from the server 10 in response to the search request, the image registration request, the provided information registration request, and the like.

The selecting unit 205 generates a selection screen for selecting desired provided information from a provided information list that is returned from the server 10 in response to the search request. The generated selection screen is displayed by the display unit 209. Further, the selecting unit 205 transmits an image ID corresponding to the selected provided information from the transmitting unit 207 to the server 10 in response to an input operation on the input unit 208 according to the selection screen.

The location information acquiring unit 220 acquires location information indicating a current location of the terminal device 20A. The location information may be acquired by using a Global Positioning System (GPS), for example.

FIG. 6 is a functional block diagram for explaining the functions of the terminal device 20B. In FIG. 6, the same components as those illustrated in FIG. 5 are denoted by the same reference symbols, and detailed explanation thereof will be omitted.

As illustrated in FIG. 1, in the first embodiment, the terminal device 20B has a function to receive a search request to the server 10 based on a captured image, and to receive provided information transmitted from the server 10 in response to the search request, among the functions of the terminal device 20A. Therefore, in the configuration of the terminal device 20B in the functional block diagram in FIG. 6, the image registration requesting unit 203 and the provided information registration requesting unit 204 included in the configuration of the terminal device 20A are removed.

Figure 7:
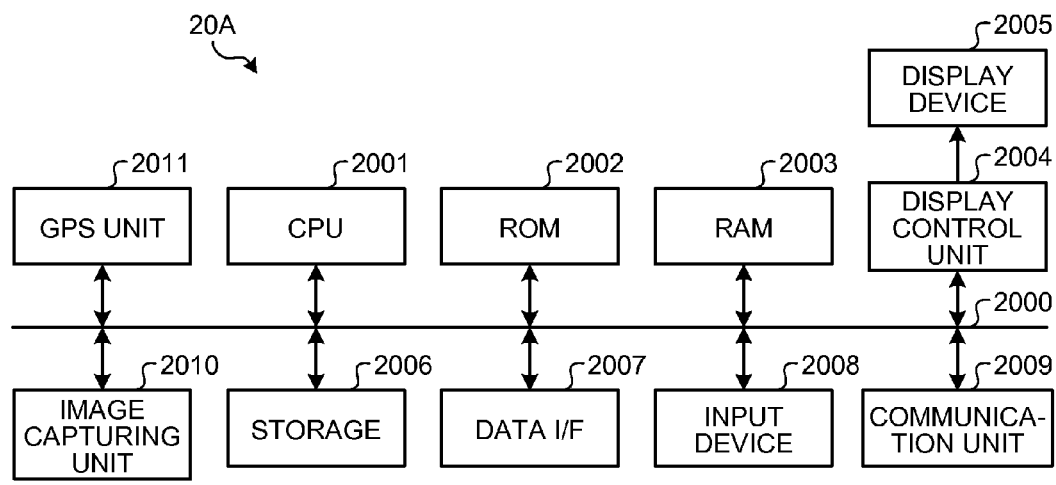
FIG. 7 is a block diagram illustrating a hardware configuration example of a terminal device applicable to the first embodiment.

FIG. 7 illustrates a hardware configuration example of the terminal device 20A applicable to the first embodiment. The terminal device 20B can be realized by the same configuration as the terminal device 20A.

In the terminal device 20A illustrated in FIG. 7, a CPU 2001, a read only memory (ROM) 2002, a random access memory (RAM) 2003, and a display control unit 2004 are connected to a bus 2000. Further, a storage 2006, a data interface (I/F) 2007, an input device 2008, a communication unit 2009, an image capturing unit 2010, and a GPS unit 2011 are connected to the bus 2000. The storage 2006 is a storage medium capable of storing data in a nonvolatile manner, and may be a nonvolatile semiconductor memory, such as a flash memory; however, it is not limited thereto. It may be possible to use a hard disk drive as the storage 2006.

The CPU 2001 controls the entire terminal device 20A by using the RAM 2003 as a working memory in accordance with a program stored in the ROM 2002 and the storage 2006. The display control unit 2004 converts a display control signal generated by the CPU 2001 to a signal in a format that can be displayed by a display device 2005, and outputs the signal.

The storage 2006 stores therein the program to be executed by the CPU 2001 and various kinds of data. Meanwhile, a single rewritable nonvolatile semiconductor memory or the like may be used as both of the storage 2006 and the ROM 2002, for example. The data I/F 2007 inputs and outputs data from and to external apparatuses. As the data I/F 2007, an interface, such as a universal serial bus (USB) or Bluetooth (registered trademark), may be employed.

The display control unit 2004 drives the display device 2005 based on the display control signal generated by the CPU 2001. The display device 2005 includes, for example, a liquid crystal display (LCD), and perform display according to the display control signal by being driven by the display control unit 2004.

The input device 2008 receives input from a user. The user gives an instruction to the terminal device 20A by operating the input device 2008 in accordance with display on the display device 2005, for example. Meanwhile, it preferable to integrate the input device 2008 and the display device 2005 as a touch panel that outputs a control signal according to a pressed position and that transmits an image on the display device 2005.

The communication unit 2009 includes a communication I/F that performs communication via a network by using wireless communication under the control of the CPU 2001.

The image capturing unit 2010 includes an optical system, an image capturing element, and a control drive circuit for the optical system and the image capturing element, performs a predetermined process on an image capturing signal output from the image capturing element, and outputs a digital signal as a captured image. The image capturing unit 2010 executes an image capturing function, a zooming function, and the like, in accordance with an instruction by a user operation on the input device 2008. The captured image output from the image capturing unit 2010 is sent to the CPU 2001 via the bus 2000, and is subjected to predetermined image processing in accordance with a program. The captured image output from the image capturing unit 2010 and subjected to the image processing may be stored in, for example, the storage 2006. Further, the CPU 2001 reads the captured image from the storage 2006 and transmits the captured image to the network by the communication unit 2009.

The GPS unit 2011 receives a signal based on the GPS, and calculates a current location represented by the latitude and the longitude based on the received signal.

Figure 8:
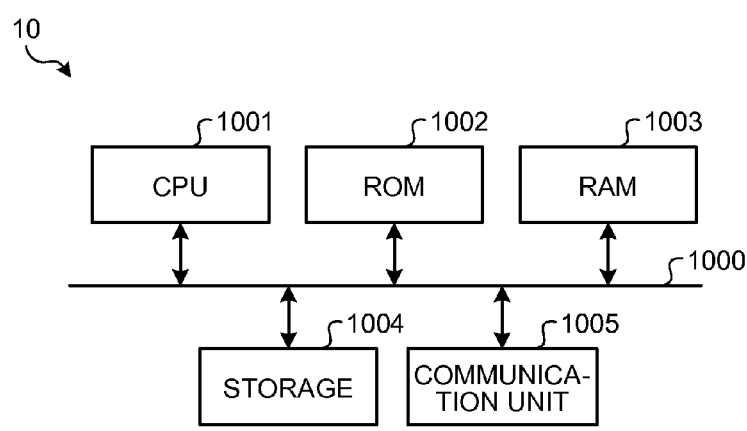
FIG. 8 is a block diagram illustrating a hardware configuration example of the server according to the first embodiment.

FIG. 8 illustrates a hardware configuration example of the server 10 according to the first embodiment. In FIG. 8, in the server 10, a CPU 1001, a ROM 1002, a RAM 1003, a storage 1004, and a communication unit 1005 are connected to a bus 1000. The storage 1004 is a storage medium capable of storing data in a nonvolatile manner, and may be a hard disk drive; however, it is not limited thereto. A nonvolatile semiconductor memory, such as a flash memory, may be used as the storage 1004.

The CPU 1001 controls the entire server 10 by using the RAM 1003 as a working memory in accordance with a program stored in the ROM 1002 and the storage 1004.

The storage 1004 stores therein a program to be executed by the CPU 1001 and various kinds of data. The image DB 100 and the provided information DB 101 as described above are constructed by using storage areas on the storage 1004. In FIG. 8, the storage 1004 consists of a single piece of hardware; however, it is not limited thereto. For example, a plurality of storage devices may be integrally managed as the single storage 1004.

The communication unit 1005 includes a communication I/F that performs communication via a network by using wireless communication under the control of the CPU 1001.

In FIG. 8, the server 10 consists of a single piece of hardware; however, it is not limited thereto. The server 10 may be constructed by integrally controlling a plurality of server devices with the similar configurations.

Operation of Server

Figure 9:
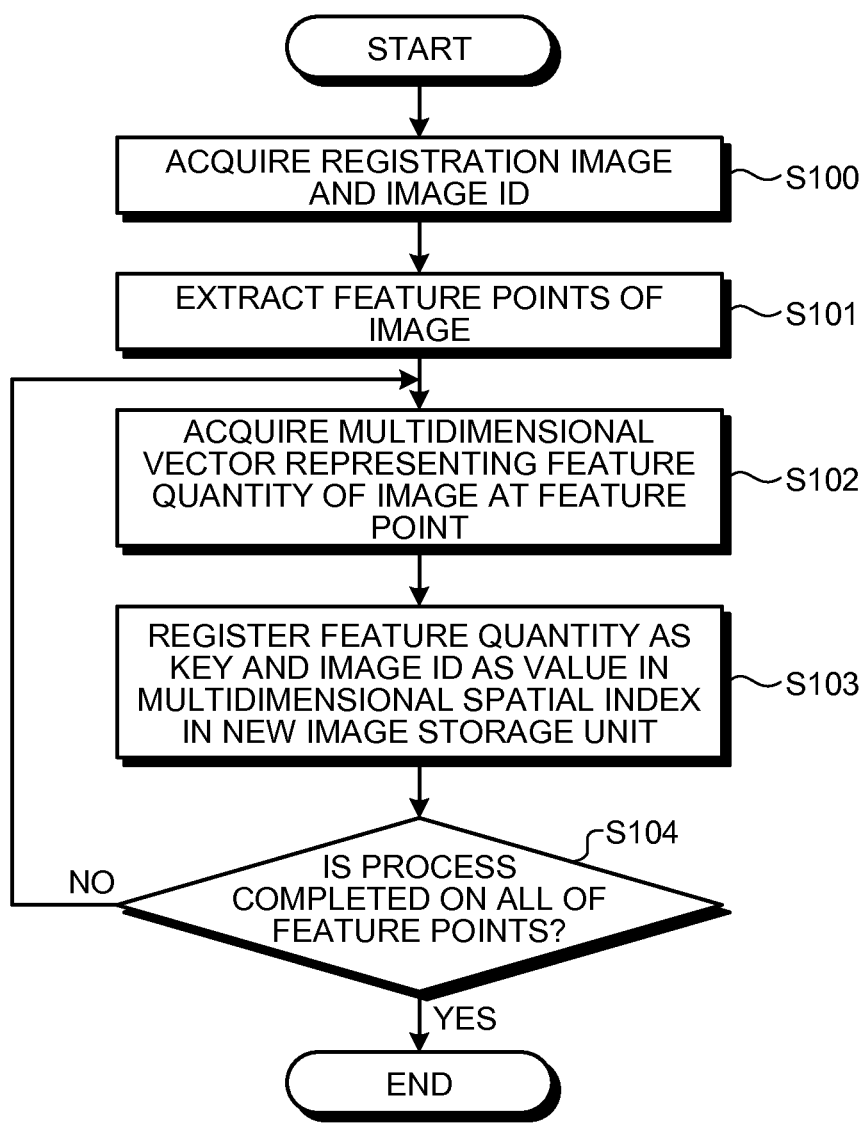
FIG. 9 is a flowchart illustrating an example of a process of registering feature information by a registration processing unit according to the first embodiment.

Operation of each of the units of the server 10 according to the first embodiment will be described in detail below. FIG. 9 is a flowchart illustrating an example of a process of registering feature information by the registration processing unit 130 according to the first embodiment. At Step S100, the registration processing unit 130 acquires a registration image and an image ID from the image registering unit 110. The registration processing unit 130 sends the acquired registration image to the feature information extracting unit 131. At subsequent Step S101, the feature information extracting unit 131 performs a process of analyzing the registration image sent from the registration processing unit 130 by using the SIFT algorithm for example, and extracts feature points of the registration image. In general, a plurality of feature points are extracted from a single registration image. Further, each of the feature points includes feature quantity as a set of a plurality of values. The feature information extracting unit 131 sends, to the registration processing unit 130, information on each of the feature points extracted from the registration image.

Subsequent Steps S102 and S103 are performed for each of the feature points extracted from the registration image at Step S101. At Step S102, the registration processing unit 130 acquires a multidimensional vector representing the feature quantity of the registration image at one feature point. At subsequent Step S103, the registration processing unit 130 stores the feature quantity acquired as the multidimensional vector at Step S102 in the new image storage unit 120. At this time, the registration processing unit 130 registers the feature quantity as a key and the image ID as a value in, for example, a K-d tree multidimensional spatial index in the new image storage unit 120.

At subsequent Step S104, the registration processing unit 130 determines whether the process is completed on all of the feature points acquired from the registration image at Step S101. If the registration processing unit 130 determines that the process is not completed on all of the feature points, the process returns to Step S102, and the process is performed on a next feature point. In contrast, when determining that the process is completed on all of the feature points, the registration processing unit 130 determines that registration of the feature information on the registration image is completed, and a series of processes in the flowchart in FIG. 9 is completed.

Figure 10:
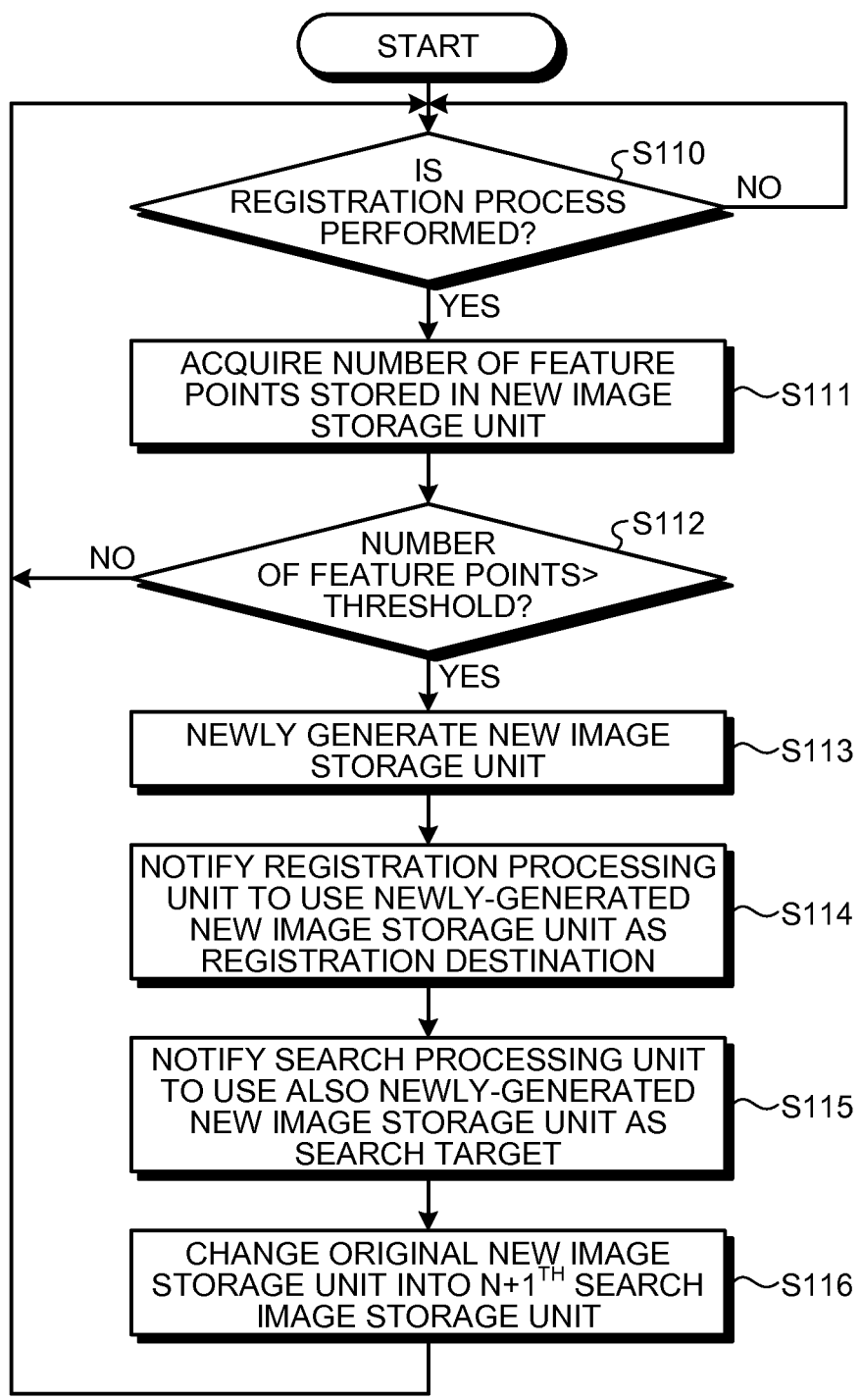
FIG. 10 is a flowchart illustrating an example of a process performed by a managing unit according to the first embodiment.

FIG. 10 is a flowchart illustrating an example of a process performed by the managing unit 122 according to the first embodiment. It is assumed that the N search image storage units 121$_1$, 121$_2$, . . . , 121$_N$ are already stored in the image DB 100 before the process illustrated in the flowchart in FIG. 10.

At Step S110, the managing unit 122 determines whether a process of registering feature information (a feature point) in the new image storage unit 120 is performed. The managing unit 122 may perform the determination by continuously monitoring the process of registering the feature information in the new image storage unit 120, or by causing the new image storage unit 120 to notify the managing unit 122 that the process of registering the feature information is performed. If the managing unit 122 determines that the registration process is not performed, the process returns to Step S110. If the managing unit 122 determines that the process of registering the feature information in the new image storage unit 120 is performed, the process proceeds to Step S111.

At Step S111, the managing unit 122 acquires, from the new image storage unit 120, the number of feature points stored in the new image storage unit 120. At subsequent Step S112, the managing unit 122 determines whether the number of feature points acquired at Step S111 exceeds a threshold. If the managing unit 122 determines that the number of the feature points does not exceed the threshold, the process returns to Step S110. In contrast, if the managing unit 122 determines that the number of the feature points stored in the new image storage unit 120 exceeds the threshold, the process proceeds to Step S113.

At Step S113, the managing unit 122 maintains the existing new image storage unit 120 as the original new image storage unit 120, and newly generates the new image storage unit 120. At subsequent Step S114, the managing unit 122 notifies the registration processing unit 130 to use the newly-generated new image storage unit 120 as a registration destination of feature information. At subsequent Step S115, the managing unit 122 notifies the search processing unit 132 to use also the newly-generated new image storage unit 120 as a search target.

At subsequent Step S116, the managing unit 122 changes the original new image storage unit 120 into an N+1$^{th}$ search image storage unit 121$_{N+1}$, and prohibits registration of a new feature point in the search image storage unit 121$_{N+1}$. After the process at Step S116 is completed, the managing unit 122 returns the process to Step S110.

Incidentally, the managing unit 122 can merge some or all of the search image storage units 121$_1$, 121$_2$, ..., 121$_N$ into a new search image storage unit. For example, the managing unit 122 performs a merge process when the number of the search image storage units 121$_1$, 121$_2$, ..., 121$_N$ becomes equal to or greater than a predetermined number; however, it is not limited thereto. The managing unit 122 may periodically perform the merge process. The managing unit 122 performs the merge process on a plurality of search image storage units while maintaining each of merge targets, such as the search image storage units 121$_1$, 121$_2$, ..., 121$_N$. Further, the managing unit 122 performs the merge process on the background of the image registration process or the image search process performed on the image DB 100. The managing unit 122, upon completing the merge process, notifies the search processing unit 132 to use a new search image storage unit generated through the merge process as a search target, and deletes all of the merged search image storage units 121$_1$, 121$_2$, ..., 121$_N$. As described above, by performing the merge process on the search image storage units 121$_1$, 121$_2$, ..., 121$_N$, it is possible to reduce the number of search targets and improve the performance.

Figure 11:
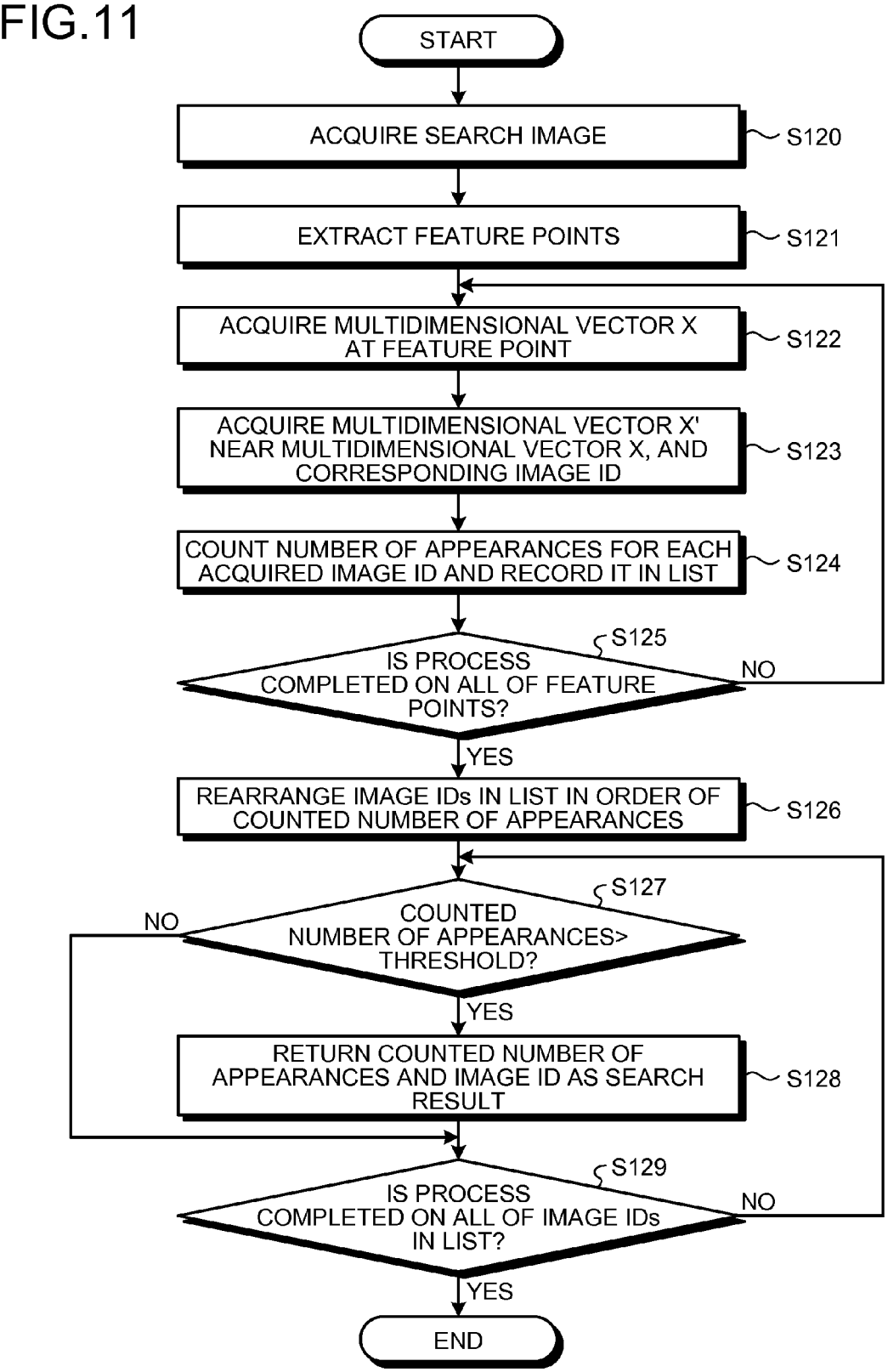
FIG. 11 is a flowchart illustrating an example of a search process performed by a search processing unit according to the first embodiment.

FIG. 11 is a flowchart illustrating an example of a search process performed by the search processing unit 132 according to the first embodiment. The flowchart in FIG. 11 indicates a search process performed on any of the new image storage unit 120 and the search image storage units 121$_1$, 121$_2$, ..., 121$_N$. In the following, for the sake of explanation, it is assumed that the new image storage unit 120 is taken as a search target. Even when any of the search image storage units 121$_1$, 121$_2$, ..., 121$_N$ is taken as a search target, the same process is performed.

At Step S120, the search processing unit 132 acquires a search request and a search image from the image searching unit 111. More specifically, with reference to FIG. 1, the terminal device 20A transmits, as a search image, a captured image obtained by capturing the image of the object 30 to the server 10, together with a search request for example (Step S1). The server 10 receives the search image and the search request, and sends them to the image searching unit 111. The image searching unit 111 sends the search image and the search request to the image DB 100, and requests a search based on the search image.

The search processing unit 132 receives the search image and the search request, in the image DB 100. The search processing unit 132 sends the acquired search image to the feature information extracting unit 131. At subsequent Step S121, the feature information extracting unit 131 performs a process of analyzing the search image sent from the search processing unit 132, and extracts feature points of the search image. The feature information extracting unit 131 sends information on each of the feature points extracted from the search image to the search processing unit 132.

Subsequent processes at Step S122 to Step S124 are performed for each of the feature points extracted from the search image at Step S121. At Step S122, the search processing unit 132 acquires a multidimensional vector X as feature quantity of a target feature point.

At subsequent Step S123, the search processing unit 132 searches the multidimensional spatial index stored in the new image storage unit 120 on the basis of the multidimensional vector X acquired at Step S122, acquires a multidimensional vector X' located near the multidimensional vector X, and acquires an image ID using the multidimensional vector X', that is, the feature quantity, as a key. For example, the search processing unit 132 determines, as a neighboring point, a point within a predetermined distance from the point of the multidimensional vector X in the multidimensional space, searches for a multidimensional vector corresponding to the neighboring point from the multidimensional spatial index, and acquires the retrieved vector as the multidimensional vector X'. At this time, the search processing unit 132 may acquire a plurality of the multidimensional vectors X' with respect to a single feature point.

At subsequent Step S124, the search processing unit 132 counts the number of appearances for each image ID by using the feature quantity acquired at Step S123 (the multidimensional vector X') as a key, and records the image ID and the counted number of appearances in a list (hereinafter, referred to as an appearance number list) in an associated manner. For example, the search processing unit 132 stores a data structure in which the image ID and the counted number of appearances are paired in a memory (for example, the RAM 1003) in a known array structure.

At subsequent Step S125, the search processing unit 132 determines whether the process is completed for all of the feature points acquired from the search image at Step S121. If the search processing unit 132 determines that the process is not completed for all of the feature points, the process returns to Step S122, and the process is performed for a next feature point. In contrast, if the search processing unit 132 determines that the process is completed for all of the feature points, the process proceeds to Step S126.

At Step S126, the search processing unit 132 rearranges the image IDs recorded in the appearance number list, in the order of the counted number of appearances. Subsequent processes at Step S127 and Step S128 are performed for each of the image IDs recorded in the appearance number list. At Step S127, the search processing unit 132 determines whether the counted number of appearances exceeds a threshold for one image ID. If the search processing unit 132 determines that the counted number of appearances does not exceed the threshold, the process proceeds to Step S129. In contrast, if the search processing unit 132 determines that the counted number of appearances of the image ID exceeds the threshold, the process proceeds to Step S128.

At Step S128, the search processing unit 132 returns, as a search result, the counted number of appearances exceeding the threshold according to the determination at Step S127, and the image ID corresponding to the counted number of appearances to the image searching unit 111. Then, the search processing unit 132 causes the process to proceed to Step S129, and determines whether the process is completed for all of the image IDs recorded in the appearance number list. If it is determined that the process is not completed, the process returns to Step S127, and the process is performed on an unprocessed image ID in the appearance number list.

In contrast, if the search processing unit 132 determines that the process on all of the image IDs recorded in the appearance number list is completed at Step S129, a series of processes in the flowchart in FIG. 11 is completed.

Figure 12:
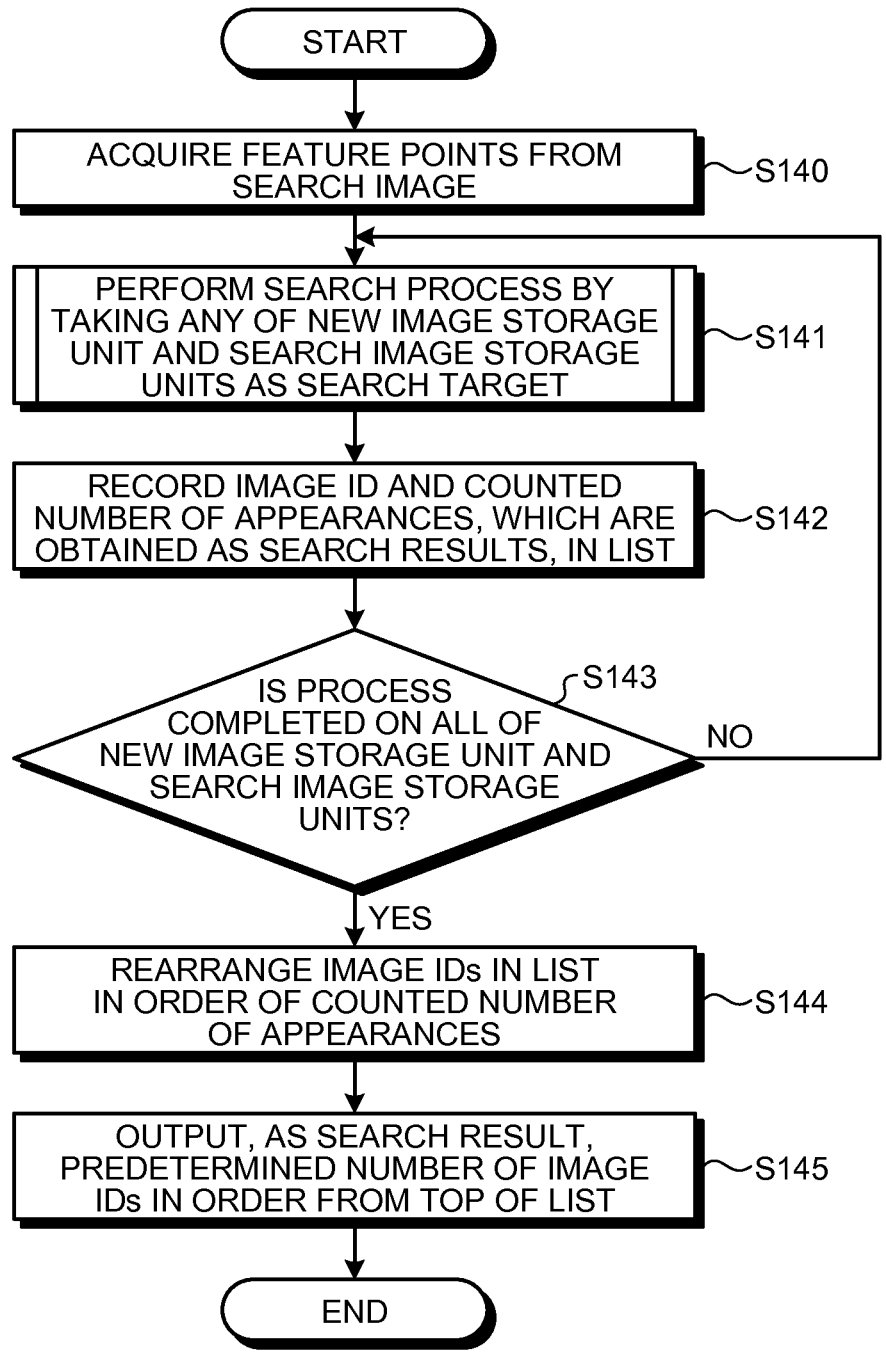
FIG. 12 is a flowchart illustrating an example of a search process performed on each of a new image storage unit and a search image storage unit by the search processing unit according to the first embodiment.

FIG. 12 is a flowchart illustrating an example of a search process performed on each of the new image storage unit 120 and the search image storage units $121_1, 121_2, \ldots, 121_N$ by the search processing unit 132 according to the first embodiment. At Step S140, which is a process corresponding to Step S120 and Step S121 as described above, the search processing unit 132 acquires a search request and a search image from the image searching unit 111, and the feature information extracting unit 131 acquires information on each of the feature points of the acquired search image.

Subsequent processes at Step S141 and Step S142 are performed on each of the new image storage unit 120 and the search image storage units $121_1, 121_2, \ldots, 121_N$. At Step S141, the search processing unit 132 takes any of the new image storage unit 120 and the search image storage units $121_1, 121_2, \ldots, 121_N$ as a search target, and performs the search process on the search target as described above with reference to FIG. 11.

In the search process, the search processing unit 132 counts the number of appearances for each image ID by using the acquired feature quantity as a key as described at Step S124 in FIG. 11, and records the image ID and the counted number of appearances in the appearance number list in an associated manner (Step S142).

If the search process on the single search target is completed, the search processing unit 132 causes the process to proceed to Step S143. At Step S143, the search processing unit 132 determines whether the process is completed on all of the new image storage unit 120 and the search image storage units $121_1, 121_2, \ldots, 121_N$. When determining that the search process is not completed, the search processing unit 132 causes the process to return to Step S141, and performs the processes at Step S141 and Step S142 by taking, as a search target, one of the new image storage unit 120 and the search image storage units $121_1, 121_2, \ldots, 121_N$ that are not yet processed.

In contrast, if the search processing unit 132 determines that the search process is completed on all of the new image storage unit 120 and the search image storage units $121_1, 121_2, \ldots, 121_N$ at Step S143, the process proceeds to Step S144.

At Step S144, the image searching unit 111 rearranges the image IDs in the appearance number list, in the order of the counted number of appearances. At subsequent Step S145, the image searching unit 111 selects a predetermined number of (for example, five) image IDs recorded in the appearance number list in order from the largest counted number of appearances on the basis of a result of the rearrangement at Step S144, and outputs an image ID list including the predetermined number of the selected image IDs as a search result. The image searching unit 111 transmits the image ID list to a transmission source (for example, the terminal device 20A) of the search request of the image ID.

Figure 13:
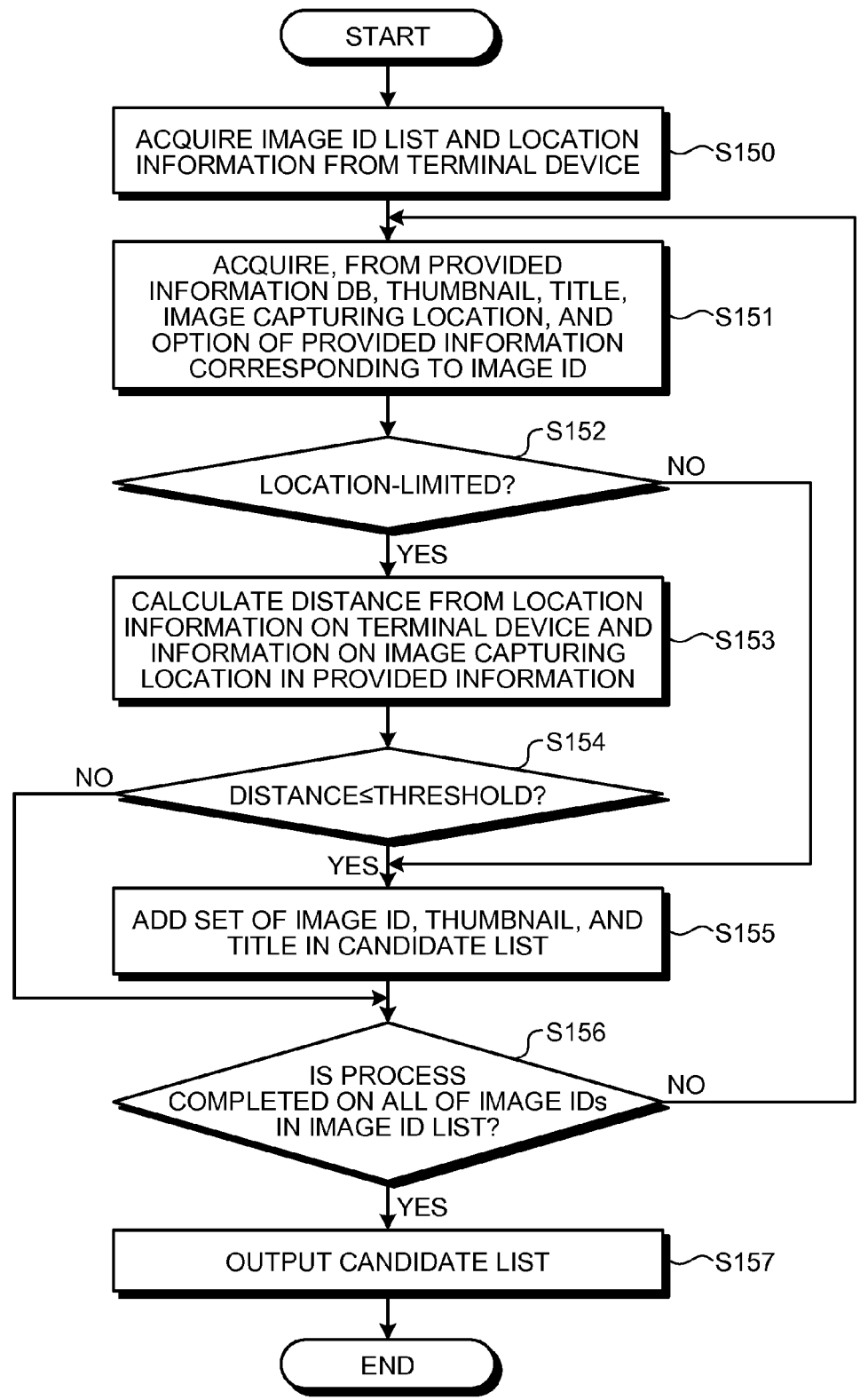
FIG. 13 is a flowchart illustrating an example of a process performed by a selecting unit according to the first embodiment.

FIG. 13 is a flowchart illustrating an example of a process performed by the selecting unit 112 according to the first embodiment. For example, it is assumed that the terminal device 20A transmits a search request to the server 10 on the basis of a captured image obtained by capturing the image of the object 30, and acquires an image ID list transmitted by the image searching unit 111 in response to the search request before the process illustrated in the flowchart in FIG. 13.

The terminal device 20A transmits the image ID list received from the image searching unit 111 to the server 10. At this time, the terminal device 20A may transmit the location information, which is acquired by the location information acquiring unit 220 and which indicates a current location of the terminal device 20A, to the server 10 together with the image ID list. The server 10 sends the received image ID list to the selecting unit 112. When receiving the location information together with the image ID list, the server 10 also sends the location information to the selecting unit 112.

At Step S150, the selecting unit 112 acquires the image ID list transmitted from the terminal device 20A, for example. When the location information is transmitted together with the image ID, the selecting unit 112 also receives the location information. Processes at Step S151 to Step S155 described below are preformed for each of the image IDs included in the image ID list.

At subsequent Step S151, the selecting unit 112 searches the provided information DB 101 for provided information corresponding to a target image ID, and extracts and acquires predetermined information from the retrieved provided information. For example, with reference to FIG. 3, the selecting unit 112 acquires information stored in each of the items of "thumbnail", "title", "image capturing location", and "option" from the provided information.

At subsequent Step S152, the selecting unit 112 determines whether the provided information is location-limited information on the basis of the item of "option" in the acquired provided information. If the selecting unit 112 determines that the provided information is not the location-limited information, the process proceeds to Step S155. In contrast, if the selecting unit 112 determines that the provided information is the location-limited information, the process proceeds to Step S153.

At Step S153, the selecting unit 112 calculates a distance between a location of the terminal device 20A and a location indicated by the item of "image capturing location" on the basis of the location information transmitted from the terminal device 20A and the item of "image capturing location" acquired at Step S151.

As a method of obtaining a distance between two points represented by the latitude and the longitude, some methods, such as the Hubeny formula and Lambert-Andoyer formula, are known, each of which has different accuracy. In the first embodiment, as a simple distance calculation method, Equation (1) below is applicable, in which triangular approximation is performed based on the assumption that the length per degree of latitude is 111 kilometers (km) and the length per degree of longitude near Japan is 91 km.

$$D = \text{SQR}(((La_1 - La_2) \times 111000)^2 + ((Lu_1 - Lu_2) \times 91000)^2) \quad (1)$$

In Equation (1), values $La_1$ and $Lu_1$ are the latitude and the longitude of a first point, respectively, and values $La_2$ and $Lu_2$ are the latitude and the longitude of a second point, respectively. Further, a distance D is a distance between the first point and the second point. A unit of the distance D is "meter (m)". A symbol SQR( ) indicates the square root of a value in a parenthesis.

At subsequent Step S154, the selecting unit 112 determines whether the distance calculated at Step 3153 is equal to or smaller than a threshold. If the selecting unit 112 determines that the distance exceeds the threshold, the process proceeds to Step S156. In contrast, if the selecting unit 112 determines that the distance is equal to or smaller than the threshold, the process proceeds to Step S155.

At Step S155, the selecting unit 112 adds, to the candidate list, the target image ID and information stored in each of the items of "thumbnail" and "title" acquired for the target image ID at Step S151, in association with the image ID. Namely, in the candidate list, candidate provided information to be selected is recorded.

At subsequent Step S156, the selecting unit 112 determines whether the process is completed for all of the image IDs included in the image ID list acquired at Step S150. When determining that the process is not completed, the selecting unit 112 causes the process to return to Step S151, and performs the subsequent processes for a single unprocessed image ID. In contrast, if the selecting unit 112 determines that the process is completed for all of the image IDs, the process proceeds to Step S157.

At Step S157, the selecting unit 112 outputs a candidate list. The output candidate list is returned to the terminal device 20A. Upon output of the candidate list, a series of processes in the flowchart in FIG. 13 is completed.

Figure 14:
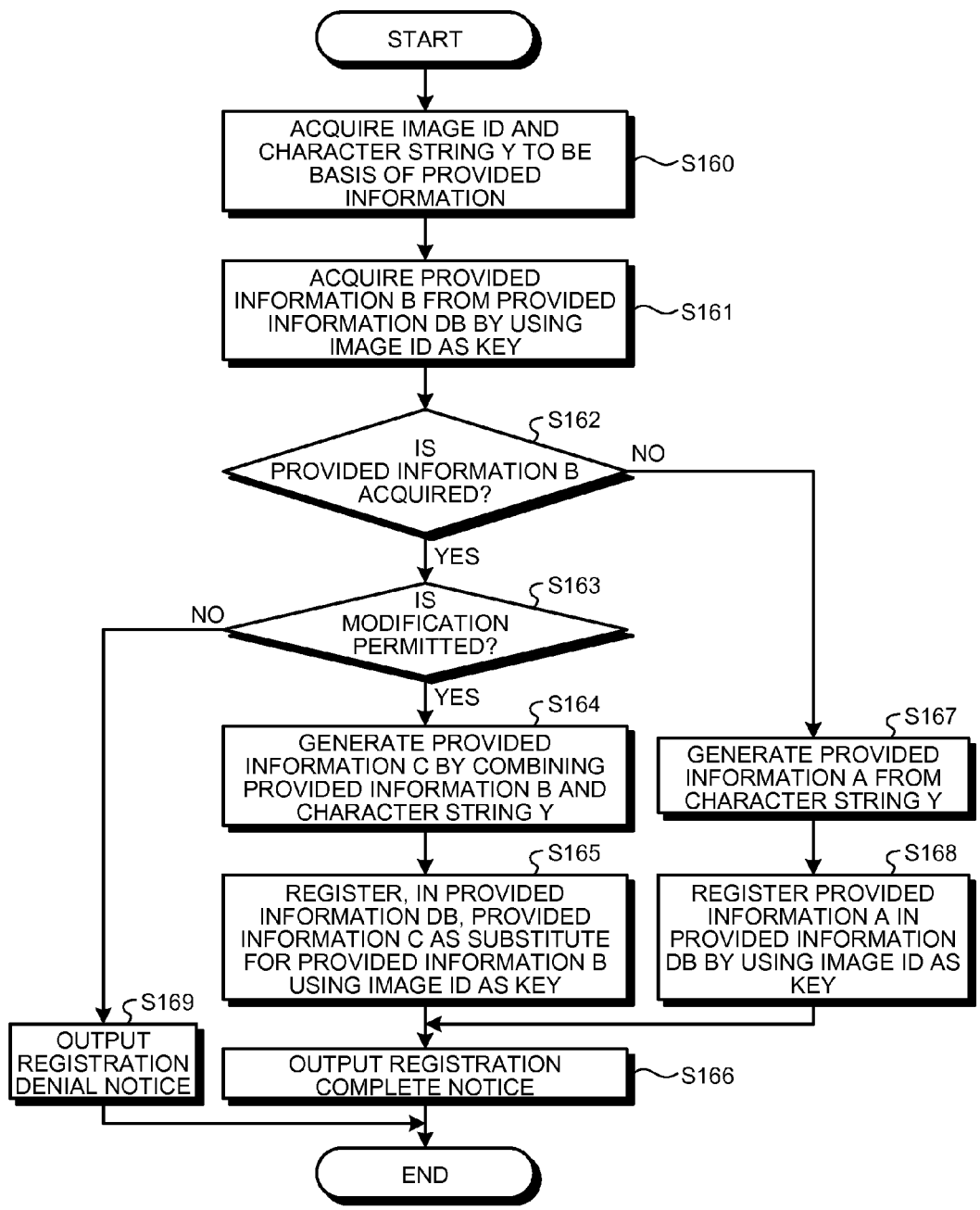
FIG. 14 is a flowchart illustrating an example of a process performed by a provided information registering unit according to the first embodiment.

FIG. 14 is a flowchart illustrating an example of a process performed by the provided information registering unit 114 according to the first embodiment.

For example, it is assumed that the terminal device 20A acquires an image ID corresponding to provided information to be added or modified from the server 10 before the process illustrated in the flowchart in FIG. 14. For example, the terminal device 20A acquires the candidate list by performing the process in the flowchart in FIG. 13 as described above, and selects a desired image ID from among image IDs included in the candidate list. Further, the terminal device 20A generates a character string Y to be registered as the provided information in accordance with an input operation on the input unit 208. The terminal device 20A transmits the selected image ID and the generated character string Y to the server 10.

Incidentally, it is preferable to send the character string Y to the server 10 in a format, such as XML or JavaScript (registered trademark) Object Notation (JSON), that can represent a data structure. For example, if the character string Y is written according to JSON, the provided information illustrated in the table in FIG. 3 is represented by Expression (2) below.

{thumbnail: '*ffd8ffe*000104*a*46 . . . ', title: 'good unknown spot for cherry blossom', contents: 'in this place . . . ', gps: '35.685,139.753', options: ['location-limited', 'additionally writable']}   (2)

At Step S160, the provided information registering unit 114 acquires the image ID and the character string Y transmitted from the terminal device 20A. At subsequent Step S161, the provided information registering unit 114 attempts to acquire provided information (hereinafter, referred to as provided information B) from the provided information DB 101 by using the image ID as a key. At subsequent Step S162, the provided information registering unit 114 determines whether the provided information B is acquired at Step S161.

If the provided information registering unit 114 determines that the information is not acquired, the process proceeds to Step S167. This means that provided information has not yet been registered for the image ID. Therefore, the provided information registering unit 114 performs a process of generating provided information (hereinafter, referred to as provided information A) from the character string Y. After the provided information registering unit 114 generates the provided information A, the process proceeds to Step S168.

Incidentally, the procedure for generating the provided information from the character string Y needs to be prepared in accordance with the schema of the provided information in the provided information DB 101 and the format used for the character string Y. The character string Y written based on JSON as represented by Expression (2) may directly be converted to the provided information such that thumbnail=Y['thumbnail'], title=Y['title'], and body text=Y ['contents'].

At subsequent Step S168, the provided information registering unit 114 registers the provided information A generated at Step S167 in the provided information DB 101 by using the image ID acquired at Step S160 as a key. After completing the registration of the provided information A, the provided information registering unit 114 causes the process to proceed to Step S166, and outputs registration complete notice. The registration complete notice is transmitted to the terminal device 20A, for example. Upon transmission of the registration complete notice, a series of processes in the flowchart in FIG. 14 is completed.

In contrast, if the provided information registering unit 114 determines that the provided information B is acquired at Step S162, the process proceeds to Step S163. At Step S163, the provided information registering unit 114 refers to the item of "option" in the provided information B acquired at Step S161, and determines whether modification of the provided information B is permitted. In this example, it is assumed that modification of the provided information B is permitted when a character string of "additionally writable" is stored in the item of "option" in the provided information B. Further, it is assumed that modification of the provided information B is not permitted when a character string of "additionally unwritable" is stored in the item of "option" in the provided information B.

When determining that modification of the provided information B is not permitted, the provided information registering unit 114 causes the process to proceed to Step S169, and outputs notice that registration is not permitted. The registration denial notice is transmitted to the terminal device 20A that is a transmission source of the image ID and the character string Y. For example, the terminal device 20A, upon receiving the registration denial notice, may display notice that registration of the input character string Y is not permitted on the display unit 209. Upon transmission of the registration denial notice, a series of processes in the flowchart in FIG. 14 is completed.

In contrast, at Step S163, if the provided information registering unit 114 determines that modification of the provided information B is permitted, the process proceeds to Step S164. At Step S164, the provided information registering unit 114 combines the provided information B and the character string Y to form new provided information (hereinafter, referred to as provided information C). If the provided information registering unit 114 generates the provided information C, the process proceeds to Step S165.

The procedure for combining the provided information B and the character string Y needs to be prepared in accordance with the schema of the provided information in the provided information DB 101 and the format used for the character string Y. For example, if the character string Y is written based on JSON as represented by Expression (2) as described above, it may be possible to employ a procedure to combine the content=Y['contents'] after the character string Y and use the values in the provided information B as they are in the other items of the provided information.

At Step S165, the provided information registering unit 114 registers the generated provided information C in the provided information DB 101 as a substitute for the provided information B using the image ID acquired at Step S160 as a key. Upon completing the registration of the provided information C, the provided information registering unit 114 causes the process to proceed to Step S166 and outputs registration complete notice. Upon transmission of the registration complete notice, a series of processes in the flowchart in FIG. 14 is completed.

Operation of Terminal Device

Operations of the terminal devices 20A and 20B according to the first embodiment will be described in detail below. As described above, the terminal device 20B does not have a function to register an image and provided information which are provided in the terminal device 20A; therefore, operations of the terminal device 20A will be mainly described below.

Figure 15:
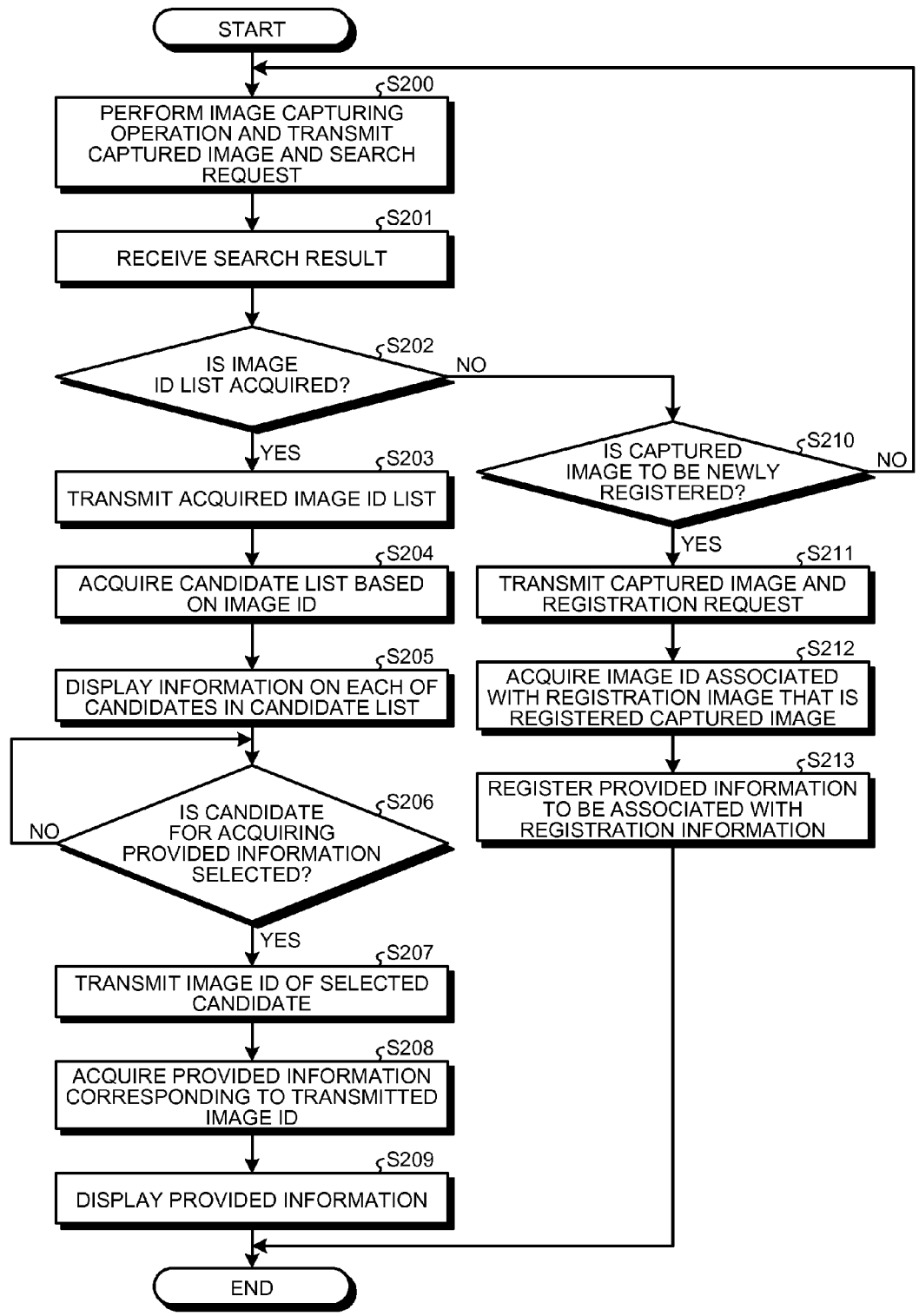
FIG. 15 is a flowchart illustrating an example of a process performed by the terminal device in relation to a process of searching for and registering an image according to the first embodiment.

FIG. 15 is a flowchart illustrating an example of a process performed by the terminal device 20A in relation to a process of searching for and registering an image according to the first embodiment. Before the process in the flowchart in FIG. 15, the terminal device 20A activates a program for executing the process of searching for and registering an image according to the first embodiment (hereinafter, the program is referred to as a terminal program).

Figure 16:
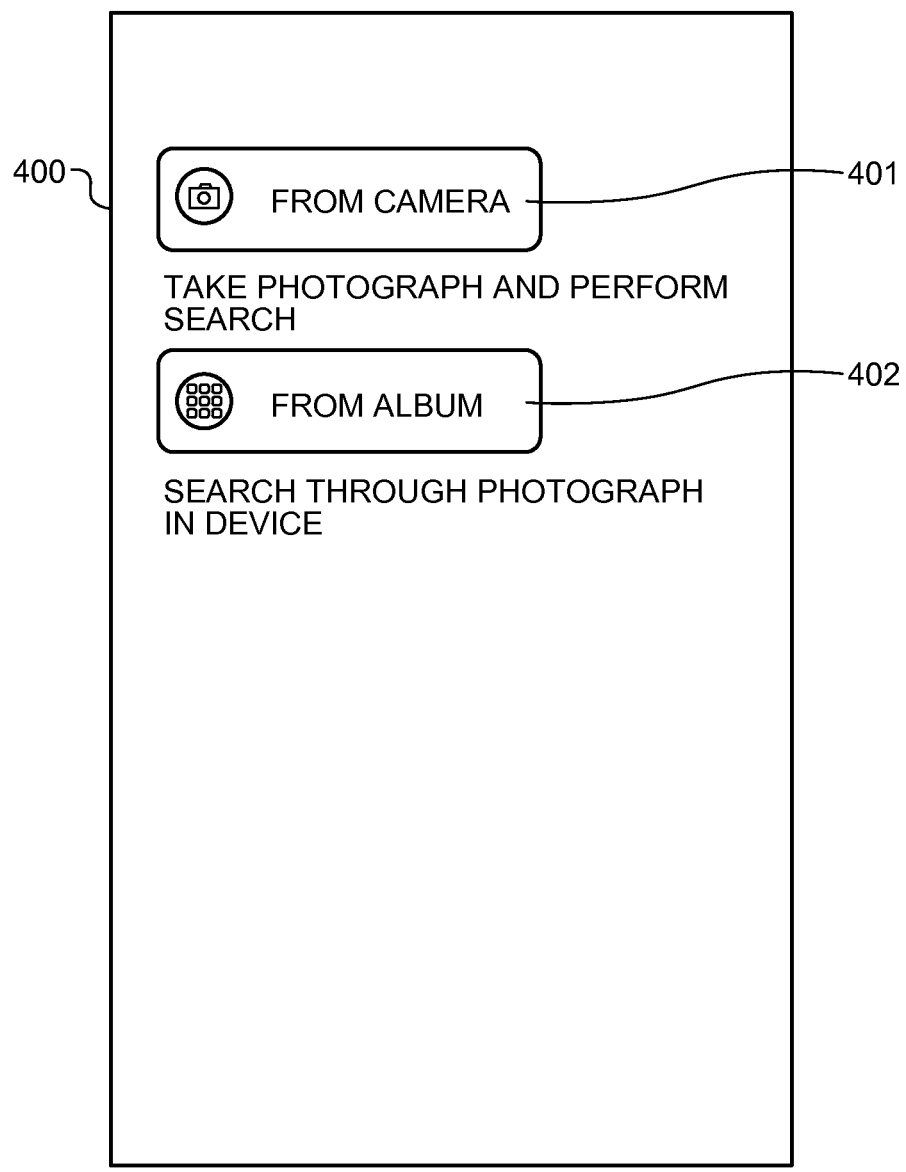
FIG. 16 is a diagram illustrating an example of an initial screen to be displayed immediately after activation of a terminal program according to the first embodiment.

FIG. 16 illustrates an example of an initial screen displayed by the display unit 209 immediately after activation of the terminal program. In FIG. 16, an initial screen 400 is provided with buttons 401 and 402 for selecting a method of acquiring an image as a search target. The button 401 is for selecting acquisition of an image by the camera function of the terminal device 20A. The button 402 is for selecting an image prepared in advance. In this case, the image may be an image stored in the storage 2006 of the terminal device 20A, or may be an image stored in a storage on a network.

In the following, an example will be described in which the button 401 is operated on the initial screen 400, and a search is performed by using an image captured by the camera function. At Step S200, the terminal device 20A performs an image capturing operation in response to an input operation on the input unit 208, and acquires a captured image. The terminal device 20A transmits, by the search requesting unit 202, the captured image and a search request to the server 10.

The server 10 performs a search process on the image DB 100 based on the captured image and the search request transmitted from the terminal device 20A, in accordance with the procedure illustrated in FIG. 11 and FIG. 12, and outputs a search result. If images similar to the captured image are retrieved, the server 10 outputs an image ID list of the images as a search result. If no image similar to the captured image is retrieved, the server 10 outputs a message indicating it as a search result. The server 10 transmits the output search result to the terminal device 20A.

At Step S201, the terminal device 20A receives, by the receiving unit 206, the search result transmitted from the server 10. At subsequent Step S202, the terminal device 20A determines whether an image ID list is acquired, on the basis of the search result. If the terminal device 20A determines that the image ID list is acquired, the process proceeds to Step S203.

At Step S203, the terminal device 20A transmits the image ID list acquired at Step S201 to the server 10. At this time, the terminal device 20A may transmit location information, which is acquired by the location information acquiring unit 220 and which indicates a current location of the terminal device 20A, to the server 10 together with the image ID list. The server 10 outputs a candidate list based on the image ID list and the location information transmitted from the terminal device 20A, in accordance with the procedure illustrated in FIG. 13. The server 10 transmits the candidate list according to the image ID list to the terminal device 20A.

At Step S204, the terminal device 20A receives, by the receiving unit 206, the candidate list that corresponds to the image ID list and that is transmitted from the server 10. At subsequent Step S205, the terminal device 20A displays, by the display unit 209, a thumbnail image and a title of each of candidates included in the received candidate list. At subsequent Step S206, the terminal device 20A determines whether a candidate for acquiring provided information is selected by an input operation on the input unit 208. If the terminal device 20A determines that a candidate is not selected, the process returns to Step S206.

Figure 17:
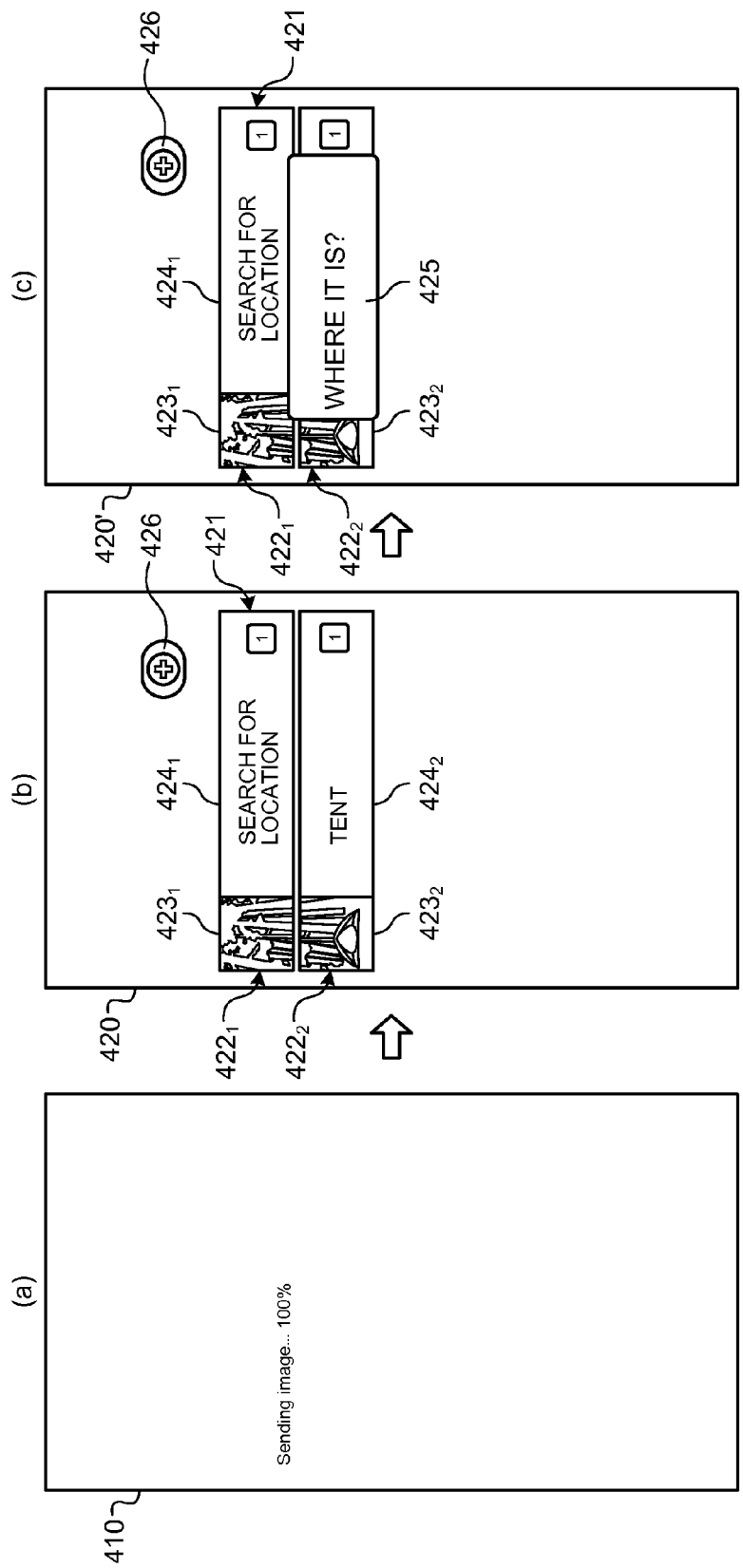
FIG. 17 is a diagram illustrating an example of transition of display by a display unit according to the first embodiment.

FIG. 17 is a diagram illustrating an example of transition of display by the display unit 209 in the series of processes from Step S203 to Step S206. FIG. 17 illustrates, at (a), an example of a standby screen 410 displayed after transmission of the image ID list at Step S203 and before display of information on the candidate list at Step S205.

FIG. 17 illustrates, at (b), an example of a candidate display screen 420 at Step S205. The candidate display screen 420 illustrated at (b) in FIG. 17 is provided with a region 421 for displaying a candidate corresponding to each of the image IDs included in the candidate list, and a button 426 for newly registering a captured image. In this example, two candidate regions $422_1$ and $422_2$ for displaying candidates corresponding to first and second image IDs are displayed in the region 421. The candidate region $422_1$ includes a thumbnail image $423_1$ and a title display $424_1$, both of which correspond to the first image ID. Similarly, the candidate region $422_2$ includes a thumbnail image $423_2$ and a title display $424_2$, both of which correspond to the second image ID.

As described above, by displaying a list of a plurality of candidates, it becomes possible to allow a user to easily select an appropriate image even when a plurality of similar images are present with respect to a captured image.

By designating an arbitrary position in, for example, the candidate region $422_1$ through an input operation on the input unit 208, the candidate displayed in the candidate region $422_1$ is selected as a candidate for providing the provided information. The same applies to the candidate region $422_2$. FIG. 17 illustrates, at (c), an example of a candidate display screen 420', in which the candidate in the candidate region $422_1$ is selected. In this example, a character string stored in the item of "body text" in provided information as the candidate for the candidate region $422_1$ is displayed in a pop-up display 425, and the selection is emphasized.

If the terminal device 20A determines that a candidate for acquiring provided information is selected at Step S206, the process proceeds to Step S207. At Step S207, the terminal device 20A transmits, by the transmitting unit 207, an image ID corresponding to the selected candidate to the server 10. The server 10 causes the provided information acquiring unit 113 to search the provided information DB 101 for provided information associated with the image ID transmitted from the terminal device 20A, and transmits a result to the terminal device 20A.

At Step S208, the terminal device 20A receives the provided information transmitted from the server 10, and acquires the provided information corresponding to the transmitted image ID. At subsequent Step S209, the terminal device 20A displays the acquired provided information on the display unit 209 for presentation to the user. Upon display of the provided information, a series of processes in the flowchart in FIG. 15 is completed.

Incidentally, the format for presenting the provided information needs to be prepared in accordance with the format and contents of the provided information. For example, in a simple mode, it may be possible to display a title and a body text side by side. Further, if the body text contains a URL of a Web page, it may be possible to display or download the contents of the Web page indicated by the URL. Furthermore, it may be possible to employ a complicated presentation method, such as to call an external application or to activate various functions of the terminal device 20A, by storing a character string in the JSON format in the body text.

At Step S202 as described above, if the terminal device 20A determines that the image ID list is not acquired, the process proceeds to Step S210. In this case, it is possible to newly register the captured image transmitted at Step S200 in the image DB 100. At Step S210, it is determined whether an operation of newly registering the captured image transmitted at Step S200 in the image DB 100 is performed on the input unit 208.

Figure 18:
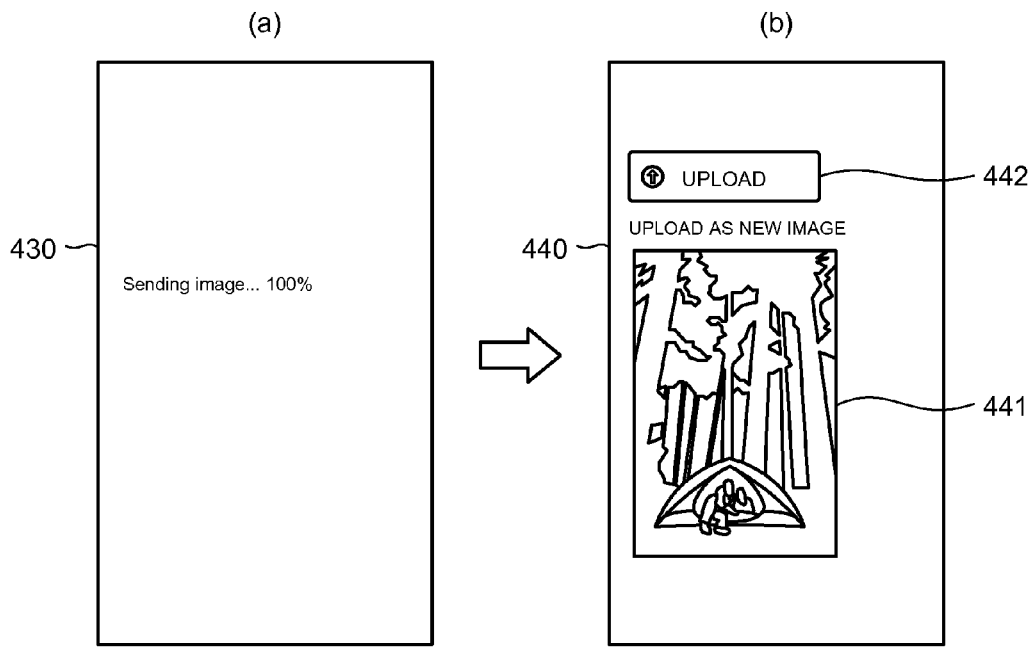
FIG. 18 is a diagram illustrating an example of an image registration screen for designating new registration of an image according to the first embodiment.

FIG. 18 illustrates an example of an image registration screen for designating new registration of an image according to the first embodiment. At Step S200 as described above, if the captured image and the search request are transmitted to the server 10, the terminal device 20A displays a standby screen 430 as illustrated at (a) in FIG. 18 on the display unit 209. At Step S202, if it is determined that the image ID list is not acquired, the terminal device 20A displays an image registration screen 440 as illustrated at (b) in FIG. 18 on the display unit 209.

In the example at (b) in FIG. 18, the image registration screen 440 is provided with a region 441 for displaying an image to be newly registered, and a button 442 for designating transmission of the image displayed in the region 441 to the server 10. In this example, the captured image acquired at Step S200 is displayed in the region 441.

At Step S210, if the terminal device 20A determines that there is no operation of newly registering the captured image, the process returns to Step S200. For example, if a cancel button (not illustrated) is operated by an input operation on the input unit 208 while the image registration screen 440 is being displayed, the terminal device 20A determines that there is no operation of newly registering the captured image.

In contrast, for example, if the button 442 on the image registration screen 440 is operated, the terminal device 20A determines that an operation of newly registering the captured image is performed, and the process proceeds to Step S211. At Step S211, the terminal device 20A transmits the captured image and a registration request to the server 10. The server 10 registers the captured image in the image DB 100 in accordance with the procedure illustrated in FIG. 9. Then, the server 10 transmits an image ID associated with a registration image, which is the registered captured image, to the terminal device 20A.

At Step S212, the terminal device 20A receives, by the receiving unit 206, the image ID transmitted from the server 10, and acquires the image ID. At subsequent Step S213, the terminal device 20A performs a process of registering the provided information in association with the registration image newly registered in the image DB 100. The process of registering the provided information by the terminal device 20A will be described later. If the terminal device 20A completes the registration of the provided information, a series of processes in the flowchart in FIG. 15 is completed.

In the above example, new registration of a captured image in the image DB 100 is enabled when the image ID list is not acquired at Step S202 and the captured image or a similar image of the captured image is not registered in the image DB 100; however, it is not limited thereto. Even when the image ID list is acquired at Step S202, it may be possible to enable new registration of the captured image in the image DB 100.

For example, at any timing of Step S203 to Step S208 in the flowchart in FIG. 15, that is, when the candidate display screen 420 or the candidate display screen 420' illustrated at (b) or (c) in FIG. 17 is displayed, and if the button 426 arranged in the screen is operated, the terminal device 20A may forcibly cause the process to shift to a process of newly registering the captured image at Step S210. By doing so, it is possible to prevent image registration by a user from being influenced by image registration by others.

Further, if the image ID list is acquired at Step S202 and the captured image is newly registered in the image DB 100, an image similar to the image already registered in the image DB 100 is registered. In this case, it may be difficult for a user who has registered an image to detect the image that the user has registered, because of similar images registered by other users.

For example, it may be possible to store information on designation to prohibit registration of a similar image in the item of "option" of the provided information. If the designation to prohibit registration of a similar image is stored in the item of "option" of the provided information, the terminal device 20A may disable the button 426 arranged in the candidate display screen 420 or the candidate display screen 420' illustrated at (b) or (c) in FIG. 17, for example. Accordingly, registration of the similar image is prohibited, and a user can easily detect the image registered by himself/herself.

Figure 19:
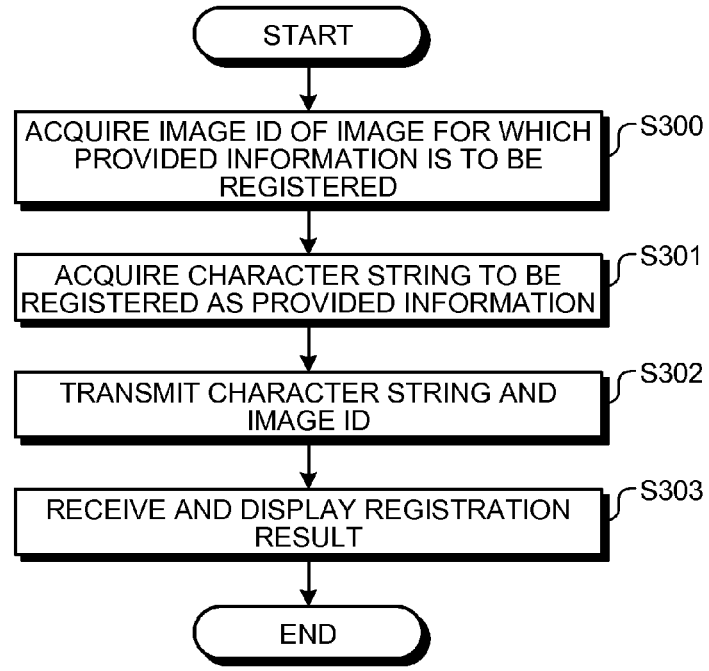
FIG. 19 is a flowchart illustrating an example of a process of registering provided information by the terminal device according to the first embodiment.

FIG. 19 is a flowchart illustrating an example of a process of registering provided information by the terminal device 20A according to the first embodiment. The process in the flowchart in FIG. 19 is performed at Step S213 in the flowchart in FIG. 15, for example; however, it is not limited thereto. It may be possible to perform the process in the flowchart in FIG. 19 as an independent process of registering provided information in the provided information DB 101.

At Step S300, the terminal device 20A acquires an image ID of an image for which provided information is to be registered. If the process is performed at Step S213 in FIG. 15, it is possible to use the image ID acquired at Step S212. If the process is performed independently, it may be possible to search the image DB 100 for the captured image and acquire the image ID, for example.

Figure 20:
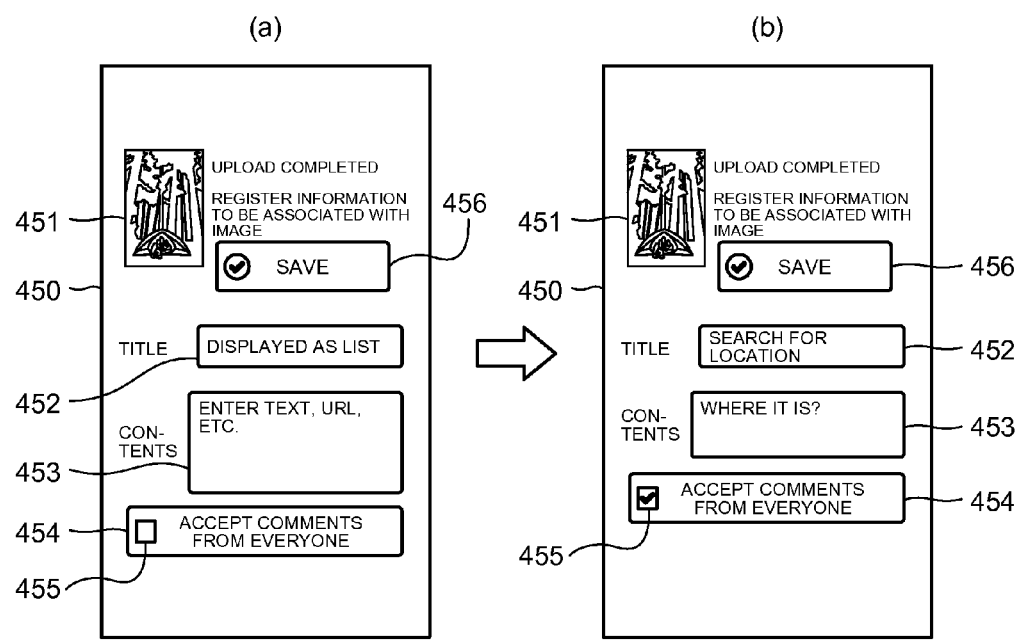
FIG. 20 is a diagram illustrating examples of an input screen for inputting a character string according to the first embodiment.

At subsequent Step S301, the terminal device 20A acquires a character string to be registered as the provided information. For example, the terminal device 20A displays an input screen for inputting the character string on the display unit 209. FIG. 20 illustrates examples of an input screen for inputting the character string according to the first embodiment. At (a) in FIG. 20, an input screen 450 is provided with an image display region 451 for displaying an image corresponding to the image ID acquired at Step S300, input regions 452 to 455 for inputting information on the items other than a thumbnail image in the provided information, and a registration button 456 for registering a character string input in each of the input regions 452 to 455 as the provided information in the provided information DB 101.

The input region 452 is a region for inputting a character string to be stored in the item of "title" in the provided information. The input region 453 is a region for inputting a character string to be stored in the item of "body text" in the provided information. The input region 454 is a region for setting the item of "option" in the provided information. In this example, a character string of additionally writable or additionally unwritable is generated in accordance with presence or absence of a check in a check box as the input region 455. FIG. 20 illustrates, at (b), a state in which information is input in each of the input regions 452 to 455.

The terminal device 20A, if the registration button 456 is specified in the input screen 450 at (b) in FIG. 20 by an input operation on the input unit 208, transmits a character string, into which a thumbnail image displayed on the image display region 451 is encoded, a character string input in each of the input regions 452 to 455, and the image ID to the server 10 (Step S302).

The server 10 registers each of the character strings as the provided information in the provided information DB 101 in association with the image ID, on the basis of the information transmitted from the terminal device 20A according to the procedure described with reference to FIG. 14. The server 10 transmits notice indicating a result of the registration process to the terminal device 20A. The terminal device 20A receives the notice of the registration result by the receiving unit 206, and displays the notice the display unit 209, for example (Step S303).

As described above, according to the first embodiment, a user is allowed to register an image and provided information in the image DB 100 and the provided information DB 101 from the terminal device 20A. Therefore, it is possible to greatly reduce a process wait time to wait for a process in the image search server (the server 10), enabling the improvement of the convenience.

Second Embodiment

Figure 21:
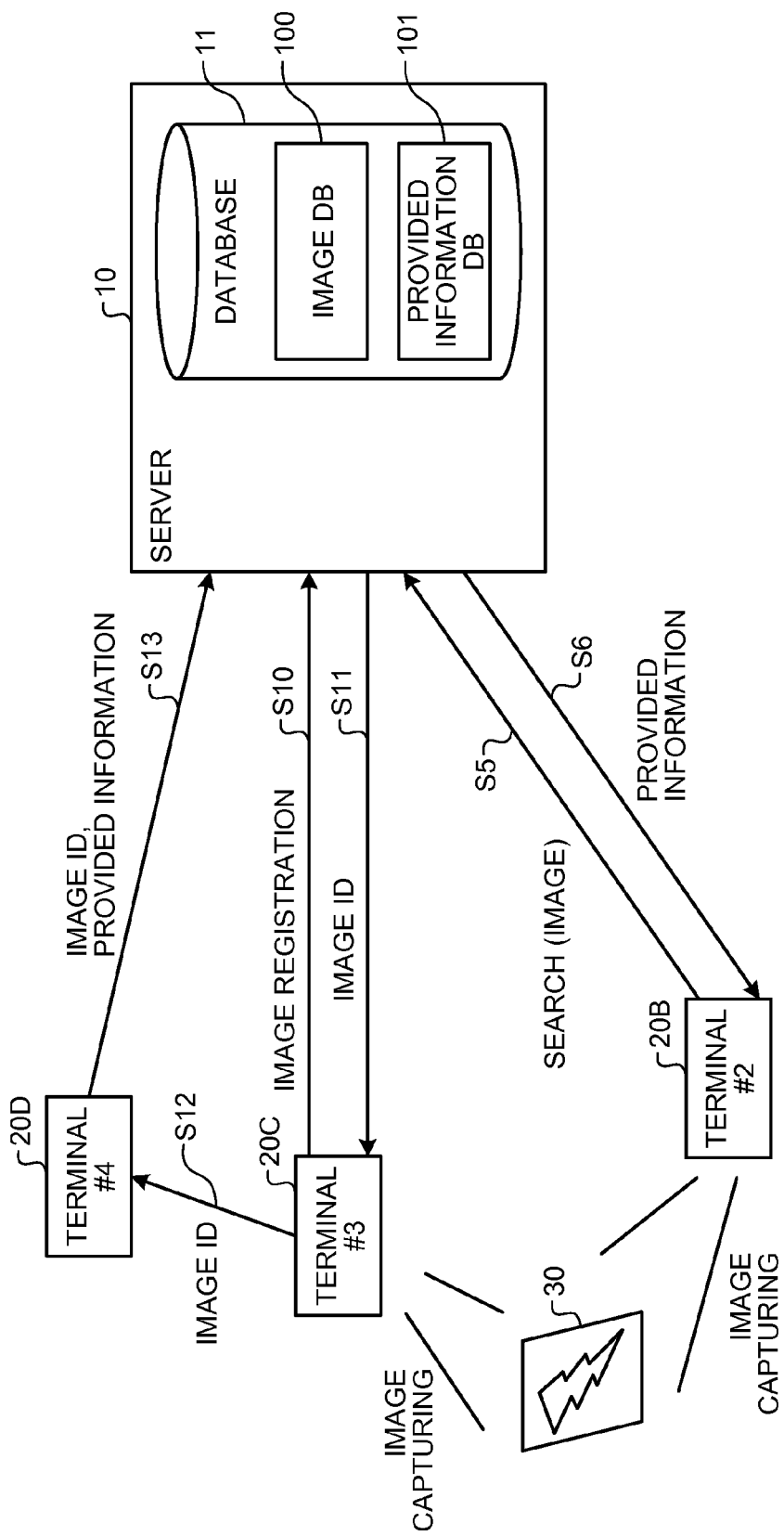
FIG. 21 is a block diagram illustrating a configuration example of an information processing system according to a second embodiment.

FIG. 21 illustrates a configuration example of an information processing system according to a second embodiment. In FIG. 21, the same components as those illustrated in FIG. 1 as described above are denoted by the same reference symbols, and detailed explanation thereof will be omitted. The second embodiment is an example, in which registration of an image and registration of provided information are performed by different terminal devices 20C and 20D. In FIG. 21, the terminal devices 20C and 20D are represented as terminals #3 and #4, respectively.

Figure 22:
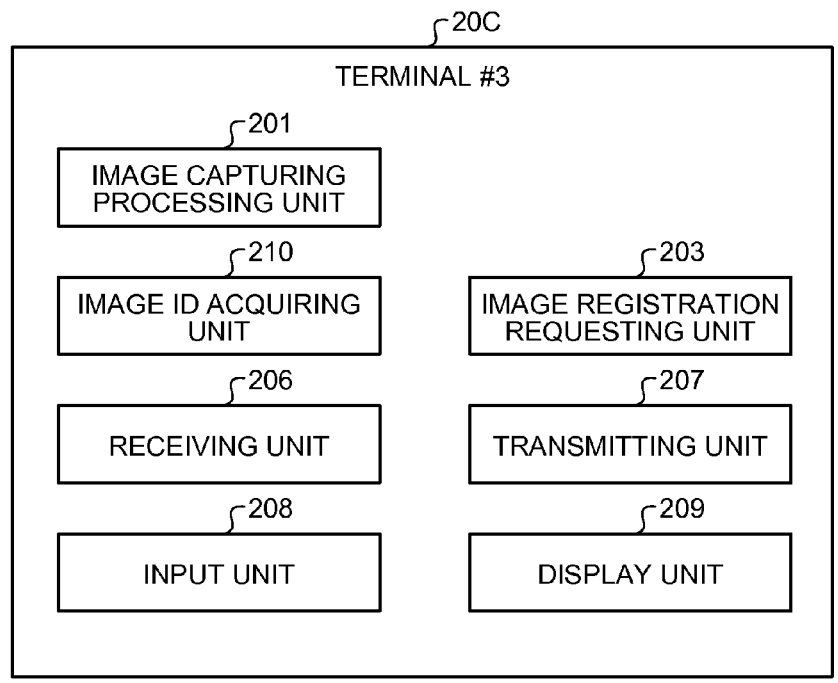
FIG. 22 is a functional block diagram for explaining functions of a terminal device according to the second embodiment.

FIG. 22 is a functional block diagram for explaining functions of the terminal device 20C according to the second embodiment. In FIG. 22, the same components as those illustrated in FIG. 5 are denoted by the same reference symbols, and detailed explanation thereof will be omitted. The terminal device 20C does not include the search requesting unit 202, the provided information registration requesting unit 204, the selecting unit 205, and the location information acquiring unit 220, as compared with the configuration of the terminal device 20A in FIG. 5. Further, the terminal device 20C additionally includes an image ID acquiring unit 210, as compared with the configuration of the terminal device 20A in FIG. 5. As the terminal device 20C, a multi-function mobile terminal or a tablet computer with an image capturing function may be employed.

Figure 23:
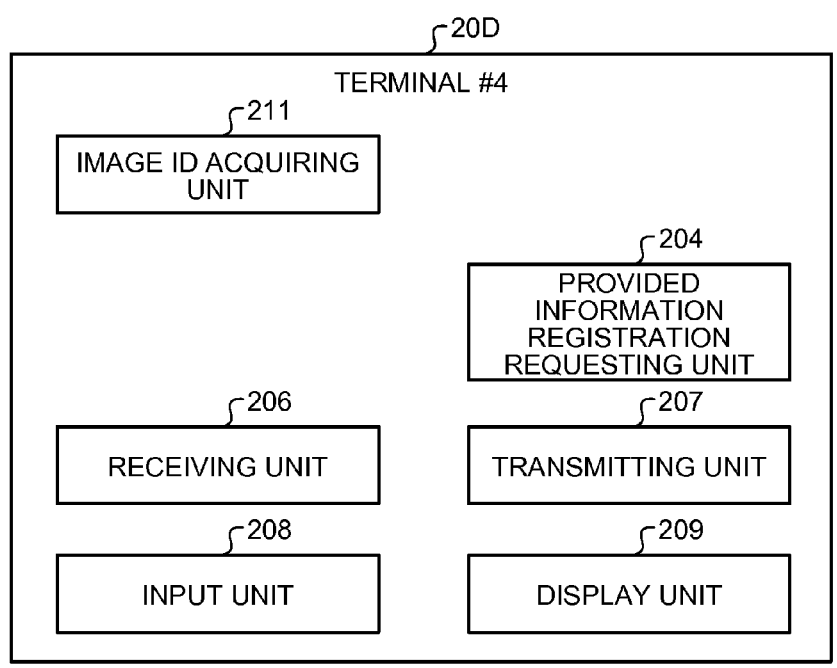
FIG. 23 is a functional block diagram for explaining functions of a terminal device according to the second embodiment.

FIG. 23 is a functional block diagram for explaining functions of the terminal device 20D according to the second embodiment. In FIG. 23, the same components as those illustrated in FIG. 5 are denoted by the same reference symbols, and detailed explanation thereof will be omitted. The terminal device 20D does not include the image capturing processing unit 201, the search requesting unit 202, the image registration requesting unit 203, the selecting unit 205, and the location information acquiring unit 220, as compared with the configuration of the terminal device 20A in FIG. 5. Further, the terminal device 20D additionally includes an image ID acquiring unit 211, as compared with the configuration of the terminal device 20A in FIG. 5. As the terminal device 20D, a multi-function mobile terminal or a tablet computer may be employed, similarly to the terminal device 20C.

In FIG. 21, the terminal device 20C transmits a captured image obtained by capturing the image of the object 30 to the server 10, together with an image registration request to request registration of the captured image, for example (Step S10). The server 10, in response to the image registration request, generates a unique image ID of the captured image, and registers the image ID and feature information on the captured image in the image DB 100 in an associated manner in accordance with the procedure described with reference to FIG. 9. Upon completion of the registration, the server 10 returns the image ID to the terminal device 20C (Step S11).

The terminal device 20C acquires, by the image ID acquiring unit 210, the image ID transmitted at Step S11. The terminal device 20C sends the acquired image ID to the terminal device 20D that registers provided information (Step S12). For example, the terminal device 20C converts the image ID to a two-dimensional code, such as a quick response (QR) code (registered trademark), and displays the code on the display unit 209; however, it is not limited thereto. The terminal device 20C may display the image ID as a character string on the display unit 209, or may convert the image ID to other image information and display the image information.

The terminal device 20D acquires, by the image ID acquiring unit 211, the image ID sent from the terminal device 20C. For example, the image ID acquiring unit 211 has the image capturing function and captures the two-dimensional code, which is converted from the image ID and displayed on the terminal device 20C. Then, the image ID acquiring unit 211 extracts and decodes the two-dimensional code from the captured image, and acquires the image ID. The terminal device 20D transmits, to the server 10, the image ID, the provided information input by the input unit 208, and a provided information registration request to request registration of the provided information (Step S13). The server 10 registers the provided information in the provided information DB 101 in association with the image ID, in accordance with the procedure described with reference to FIG. 14.

As described above, even in the second embodiment, a user can register an image and provided information in the image DB 100 and the provided information DB 101 from the terminal device 20C and the terminal device 20D. Therefore, it is possible to greatly reduce a process wait time to wait for a process in the image search server (the server 10), enabling the improvement of the convenience.

Incidentally, if the image ID is known to a person with bad intentions, the provided information may be modified in an undesired manner. To prevent this, it may be possible to issue a temporary password. In this case, for example, the terminal device 20C generates a password formed of several (for example, 5) random alphanumeric characters, and stores the password in the provided information DB 101 together with a period of validity. The terminal device 20C displays the password on the screen of the terminal device 20C, independent of the process of sending the image ID to the terminal device 20D at Step S12. When the terminal device 20D performs a process of registering the provided information, by adding a condition of whether a temporary password is input to the condition for determining whether to permit modification of the provided information, it becomes possible to allow only a person who can view the screen of the terminal device 20C to register the provided information.

Third Embodiment

Figure 24:
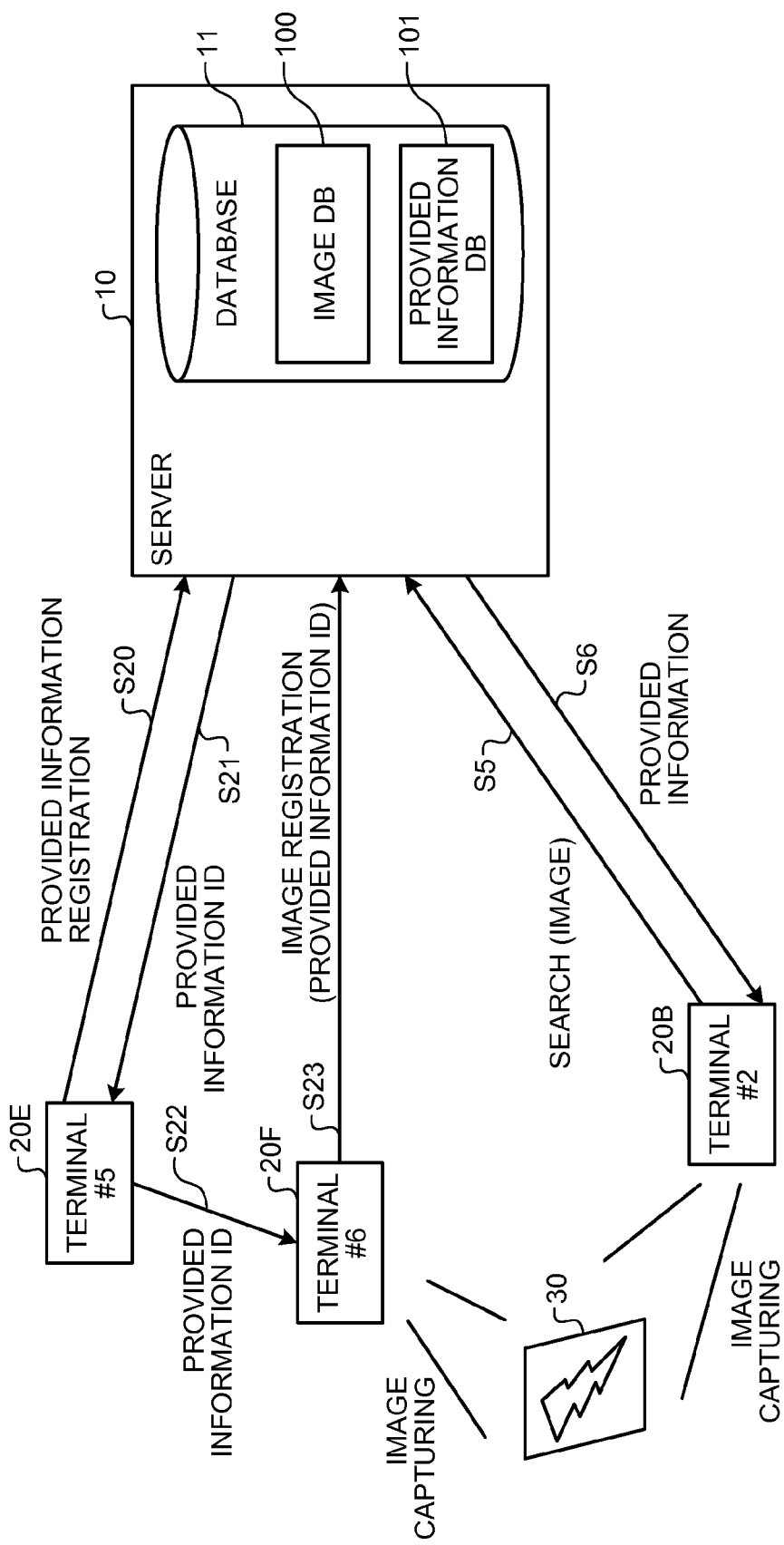
FIG. 24 is a block diagram illustrating a configuration example of an information processing system according to a third embodiment.

FIG. 24 illustrates a configuration example of an information processing system according to a third embodiment. In FIG. 24, the same components as those illustrated in FIG. 1 as described above are denoted by the same reference symbols, and detailed explanation thereof will be omitted. The third embodiment is an example, in which registration of an image and registration of provided information are performed by different terminal devices 20E and 20F. In FIG. 24, the terminal devices 20E and 20F are represented as terminals #5 and #6, respectively.

Meanwhile, in the above described second embodiment, after an image is registered in the image DB 100 and an image ID is acquired, provided information is registered in the provided information DB 101 on the basis of the acquired image ID. In contrast, in the third embodiment, provided information is registered in the provided information DB 101, a provided information ID is acquired, and then an image is registered in the image DB 100 on the basis of the acquired provided information ID.

Figure 25:
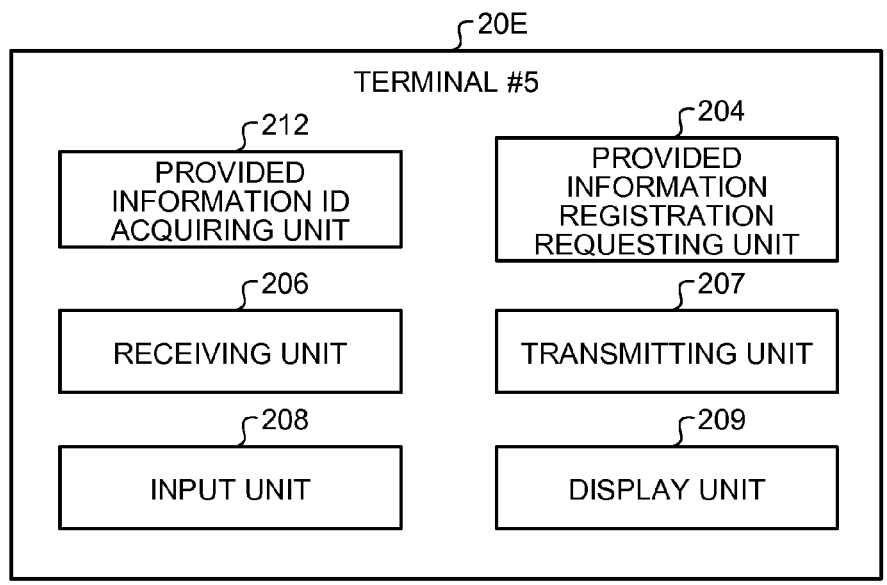
FIG. 25 is a functional block diagram for explaining functions of a terminal device according to the third embodiment.

FIG. 25 is a functional block diagram for explaining functions of the terminal device 20E according to the third embodiment. In FIG. 25, the same components as those illustrated in FIG. 5 are denoted by the same reference symbols, and detailed explanation thereof will be omitted. The terminal device 20E does not include the image capturing processing unit 201, the search requesting unit 202, the image registration requesting unit 203, the selecting unit 205, and the location information acquiring unit 220, as compared with the configuration of the terminal device 20A in FIG. 5. Further, the terminal device 20D additionally includes a provided information ID acquiring unit 212, as compared with the configuration of the terminal device 20A in FIG. 5. A multi-function mobile terminal or a tablet computer may be employed as the terminal device 20E. The terminal device 20E need not have an image capturing function, and therefore, a normal desktop computer may be employed.

Figure 26:
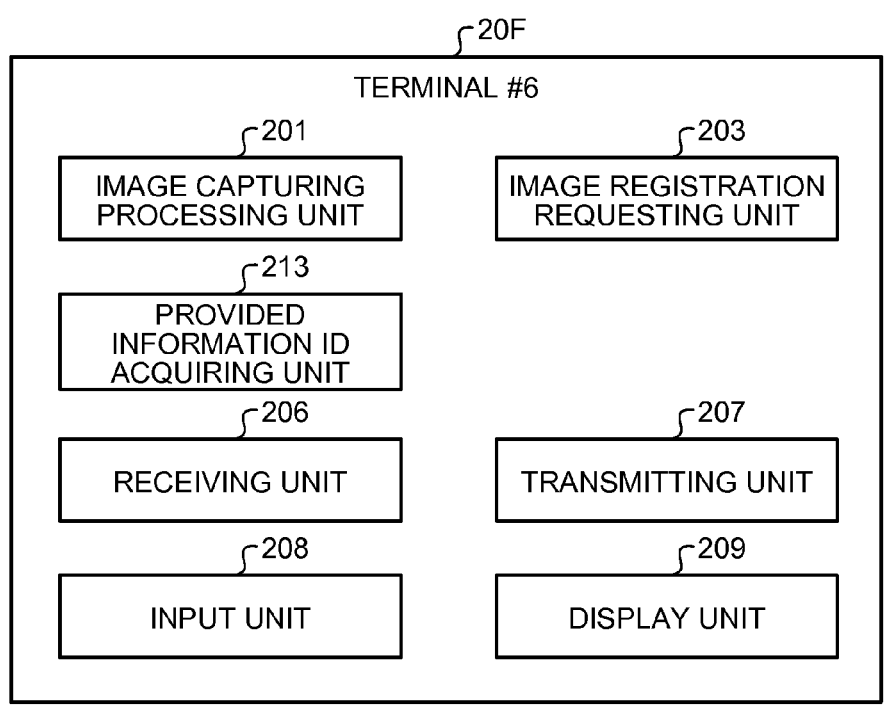
FIG. 26 is a functional block diagram for explaining functions of a terminal device according to the third embodiment.

FIG. 26 is a functional block diagram for explaining functions of the terminal device 20F according to the third embodiment. In FIG. 26, the same components as those illustrated in FIG. 5 are denoted by the same reference symbols, and detailed explanation thereof will be omitted. The terminal device 20F does not include the search requesting unit 202, the provided information registration requesting unit 204, the selecting unit 205, and the location information acquiring unit 220, as compared with the configuration of the terminal device 20A in FIG. 5. Further, the terminal device 20C additionally includes a provided information ID acquiring unit 213, as compared with the configuration of the terminal device 20A in FIG. 5. A multi-function mobile terminal or a tablet computer with an image capturing function may be employed as the terminal device 20F.

In FIG. 24, the terminal device 20E transmits, to the server 10, provided information input by the input unit 208 and a provided information registration request to request registration of the provided information (Step S20). The server 10 registers the provided information in the provided information DB 101, in accordance with the procedure described with reference to FIG. 14. At this time, the provided information registering unit 114 of the server 10 generates a provided information ID unique to the provided information for which registration is requested. The provided information registering unit 114 returns the generated provided information ID to the terminal device 205 (Step S21).

Incidentally, similarly to the process of generating an image ID by the image registering unit 110 as described above, the provided information registering unit 114 may generate a character string by generating a predetermined number of alphanumeric characters at random, check whether the character string is a duplicate of an already-generated provide information, and use, as the provided information ID, the character string determined as not being the duplicate.

The terminal device 20E acquires, by the provided information ID acquiring unit 212, the provided information ID transmitted at Step S21. The terminal device 20E sends the acquired provided information ID to the terminal device 20F that registers the image (Step S22). For example, the terminal device 205 converts the provided information ID into a two-dimensional code, such as a QR code (registered trademark), and displays the code on the display unit 209; however, it is not limited thereto. The terminal device 20E may display the provided information ID as a character string on the display unit 209, or may convert the provided information ID to other image information and display the image information.

The terminal device 20F acquires, by the provided information ID acquiring unit 213, the provided information ID sent from the terminal device 20E. For example, the provided information ID acquiring unit 213 captures, by the image capturing processing unit 201, the two-dimensional code, which is converted from the provided information ID and displayed on the terminal device 20E Then, the provided information ID acquiring unit 213 extracts and decodes the two-dimensional code from the captured image, and acquires the provided information ID. The terminal device 20F transmits, to the server 10, the provided information ID, the captured image of the object 30 captured by the image capturing processing unit 201, and an image registration request to request registration of the image (Step S23). The server 10 registers the image in the image DB 100 in association with the provided information ID, in accordance with the procedure described with reference to FIG. 9.

As described above, even in the third embodiment, a user can register an image and provided information in the image DB 100 and the provided information DB 101 from the terminal device 20E and the terminal device 20F. Therefore, it is possible to greatly reduce a process wait time to wait for a process in the image search server (the server 10), enabling the improvement of the convenience.

According to an embodiment of the present invention, it is possible to improve the convenience of information transmission and reception using an image search.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system including an information processing apparatus and one or more terminal devices, the information processing system comprising:
    an image transmitting unit configured to transmit an image;
    an image acquiring unit configured to acquire the image transmitted by the image transmitting unit, and assign unique identification information to the acquired image;
    a feature information extracting unit configured to extract feature information from the image acquired by the image acquiring unit;
    a first image storage unit configured to store therein the feature information and the identification information in an associated manner; and
    a managing unit configured to, when an amount of the feature information stored in the first image storage unit exceeds a threshold, change the first image storage unit into a second image storage unit, generate a new first image storage unit, and prohibit the second image storage unit from storing therein new feature information;
    a search request transmitting unit configured to transmit an image and a search request;
    a search request acquiring unit configured to acquire the image and the search request transmitted by the search request transmitting unit; and
    an image searching unit configured to perform an image search process of searching the first image storage unit and the second image storage unit for the identification information corresponding to the image acquired by the search request acquiring unit, in accordance with the search request acquired by the search request acquiring unit;
    wherein each of the first image storage unit and the second image storage unit are configured to extract feature information from the image acquired by the image searching unit, calculate a similarly between the extracted feature information and feature information stored therein, and output, based on the calculated similarity, identification information corresponding to feature information that is determined as being similar to the extracted feature information, from among the feature information stored therein, according to the image search process.

2. The information processing system according to claim 1, wherein the managing unit is configured to, when number of second image storage units becomes equal to or greater than a predetermined number,
    merge a plurality of the second image storage units into a new single second image storage unit.

3. The information processing system according to claim 1, wherein the image searching unit is configured to
    acquire, as a search result, a predetermined number of pieces of identification information from among the output identification information.

4. The information processing system according to claim 3, wherein the image searching unit is configured to
    count a number of times at which the identification information is output, for each piece of identification information, and
    extract, as the search result, the predetermined number of pieces of the identification information from among the output identification information in order from largest counted number.

5. The information processing system according to claim 1, further comprising:
    a provided information transmitting unit configured to transmit provided information to be provided to a user;
    a provided information acquiring unit that acquires the provided information and the identification information corresponding to the provided information; and
    a provided information storage unit that stores the provided information acquired by the provided information acquiring unit in association with the identification information corresponding to the provided information.

6. The information processing system according to claim 5, further comprising:
    an identification information transmitting unit configured to acquire the identification information output by the first image storage unit and the second image storage unit, and transmit the acquired identification information; and
    a provided information searching unit configured to acquire the identification information transmitted by the identification information transmitting unit, and perform a provided information search process of searching the provided information storage unit for the provided information corresponding to the acquired identification information.

7. The information processing system according to claim 6, wherein
the provided information storage unit is configured to store the provided information as information containing a plurality of items, and
output information stored as some of the items in the provided information associated with one or more identification information acquired by the provided information searching unit, together with the one or more identification information according to the provided information search process.

8. The information processing system according to claim 5, wherein the one or more terminal devices include a first terminal device including the image transmitting unit and the provided information transmitting unit.

9. The information processing system according to claim 5, wherein the one or more terminal devices include
a second terminal device including the image transmitting unit, and
a third terminal device including the provided information transmitting unit.

10. The information processing system according to claim 9, wherein the third terminal device acquires the identification information from the second terminal device.

11. The information processing system according to claim 9, wherein the second terminal device acquires the identification information from the third terminal device.

12. An information processing method comprising:
acquiring an image;
assigning unique identification information to the acquired image;
extracting feature information from the acquired image;
storing the feature information and the identification information in a first image storage unit in an associated manner; and
when an amount of feature information stored in the first image storage unit exceeds a threshold, changing the first image storage unit into a second image storage unit, generating a new first image storage unit, and prohibiting the second image storage unit from storing therein new feature information;
transmitting an image and a search request;
acquiring the image and the search request transmitted by the search request transmitting unit;
performing an image search process of searching the first image storage unit and the second image storage unit for the identification information corresponding to the image acquired by the search request acquiring unit, in accordance with the search request acquired by the search request acquiring unit;
extracting feature information from the image acquired by the image searching unit, calculate a similarly between the extracted feature information and feature information stored therein, and
outputting, based on the calculated similarity, identification information corresponding, to feature information that is determined as being similar to the extracted feature information, from among the feature information stored therein, according, to the image search process.

13. An information processing apparatus comprising:
an image acquiring unit configured to acquire an image and assign unique identification information to the acquired image;
a feature information extracting unit configured to extract feature information from the image acquired by the image acquiring unit;
a first image storage unit configured to store therein the feature information and the identification information in an associated manner; and
a managing unit configured to, when an amount of feature information stored in the first image storage unit exceeds a threshold, change the first image storage unit into a second image storage unit, generate a new first image storage unit, and prohibit the second image storage unit from storing therein new feature information;
a search request transmitting unit configured to transmit an image and a search request;
a search request acquiring, unit configured to acquire the image and the search request transmitted by the search request transmitting unit; and
an image searching unit configured to perform an image search process of searching the first image storage unit and the second image storage unit for the identification information corresponding to the image acquired by the search request acquiring unit, in accordance with the search request acquired by the search request acquiring unit:
wherein each of the first image storage unit and the second image storage unit are configured to extract feature information from the image acquired by the image searching unit, calculate a similarly between the extracted feature information and feature information stored therein, and output, based on the calculated similarity, identification information corresponding to feature information that is determined as being similar to the extracted feature information, from among the feature information stored therein, according to the image search process.

* * * * *